(12) United States Patent
Kim

(10) Patent No.: US 10,808,991 B2
(45) Date of Patent: Oct. 20, 2020

(54) REFRIGERATOR

(71) Applicant: LG ELECTRONICS INC., Seoul (KR)

(72) Inventor: Sangoh Kim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 16/740,898

(22) Filed: Jan. 13, 2020

(65) Prior Publication Data

US 2020/0149802 A1    May 14, 2020

Related U.S. Application Data

(63) Continuation of application No. 16/448,448, filed on Jun. 21, 2019, now Pat. No. 10,578,352, which is a (Continued)

(30) Foreign Application Priority Data

Aug. 25, 2015 (KR) .................. 10-2015-0119526

(51) Int. Cl.
*F25D 27/00* (2006.01)
*F25D 23/02* (2006.01)
(Continued)

(52) U.S. Cl.
CPC .............. *F25D 27/005* (2013.01); *F21V 3/00* (2013.01); *F21V 23/0471* (2013.01);
(Continued)

(58) Field of Classification Search
CPC ............ F25D 27/005; F25D 2323/023; F25D 2700/04; F25D 23/02; F25D 27/00;
(Continued)

(56) References Cited

U.S. PATENT DOCUMENTS 6,059,420 A    5/2000 Rogers
9,702,619 B2   7/2017 Kendall
(Continued)

FOREIGN PATENT DOCUMENTS

CN    102519204    6/2012
CN    102741919    10/2012
(Continued)

OTHER PUBLICATIONS

Chinese Office Action issued in Application No. 201680003541.7 dated Feb. 1, 2019, 19 pages (with English Translation).
(Continued)

*Primary Examiner* — Cara E Rakowski
*Assistant Examiner* — Jessica M Apenteng
(74) *Attorney, Agent, or Firm* — KED & Associates LLP

(57) ABSTRACT

The refrigerator includes a cabinet having a storage compartment therein, an illumination device for illuminating the interior of the storage compartment, a door hinged to the cabinet for opening and closing the storage compartment, the door having an opening formed therein and a panel assembly having a front panel provided at the front thereof, a knock sensor module including a microphone module for sensing a sound wave generated by knock vibration applied to the door and a module microcomputer for determining whether the knock vibration is a predetermined knock based on the sensed sound wave, and a controller provided separately from the module microcomputer for receiving a knock-on signal from the module microcomputer and operating the illumination device such that light is transmitted through the panel assembly, whereby the interior of the storage compartment can be seen from outside the door.

19 Claims, 18 Drawing Sheets

Related U.S. Application Data continuation of application No. 15/310,043, filed as application No. PCT/KR2016/009413 on Aug. 25, 2016, now Pat. No. 10,443,925.

(51) Int. Cl.

| | | |
|---|---|---|
| *F25D 29/00* | (2006.01) | |
| *H05B 47/12* | (2020.01) | |
| *F21V 3/00* | (2015.01) | |
| *F21V 23/04* | (2006.01) | |
| *G10L 21/0232* | (2013.01) | |
| *H04R 1/02* | (2006.01) | |
| *H04R 1/04* | (2006.01) | |
| *H05B 47/105* | (2020.01) | |
| *F21Y 115/10* | (2016.01) | |
| *F21W 131/305* | (2006.01) | |

(52) U.S. Cl.
CPC ............. *F25D 23/02* (2013.01); *F25D 27/00* (2013.01); *F25D 29/00* (2013.01); *F25D 29/005* (2013.01); *G10L 21/0232* (2013.01); *H04R 1/028* (2013.01); *H04R 1/04* (2013.01); *H05B 47/12* (2020.01); *F21W 2131/305* (2013.01); *F21Y 2115/10* (2016.08); *F25D 2323/023* (2013.01); *F25D 2700/04* (2013.01); *H05B 47/105* (2020.01)

(58) Field of Classification Search
CPC ...... F25D 29/005; F21V 3/00; F21V 23/0471; F21D 29/00; G10L 21/0232; H04R 1/04; F21Y 2115/10; H05B 47/105; H05B 47/12; F21W 2131/305
USPC .......................................................... 362/92
See application file for complete search history.

(56) References Cited

U.S. PATENT DOCUMENTS

| | | |
|---|---|---|
| 2011/0134627 A1 | 6/2011 | Hamlin |
| 2014/0011133 A1 | 1/2014 | Liu et al. |
| 2014/0111333 A1 | 4/2014 | Haas |
| 2015/0035432 A1 | 2/2015 | Kendall et al. |

FOREIGN PATENT DOCUMENTS

| | | |
|---|---|---|
| CN | 202734419 | 2/2013 |
| EP | 2 789 943 | 10/2014 |
| EP | 3 086 061 | 10/2016 |
| JP | 1-174877 | 7/1989 |
| JP | 3061805 | 7/2000 |
| JP | 2004-225968 | 8/2004 |
| KR | 10-2004-0085325 | 10/2004 |
| KR | 10-2011-0090739 | 8/2011 |
| KR | 10-2013-0027101 | 3/2013 |
| KR | 10-2013-0072562 | 7/2013 |
| KR | 10-2014-0128098 | 11/2014 |
| KR | 10-2015-0016683 | 2/2015 |
| WO | WO 2007/115587 | 10/2007 |
| WO | WO 2014/175639 | 10/2014 |
| WO | WO 2016/175562 | 11/2016 |

OTHER PUBLICATIONS

U.S. Office Action issued in U.S. Appl. No. 15/310,043 dated Jul. 26, 2018.
European Search Report issued in European Application No. 16797709.9 dated Jan. 26, 2018, 10 pages.
U.S. Notice of Allowance issued in U.S. Appl. No. 15/310,043 dated Mar. 20, 2019.
U.S. Notice of Allowance issued in U.S. Appl. No. 16/448,448 dated Jun. 21, 2019.
European Search Report issued in Application No. 20157702.0 dated Jun. 22, 2020.

REFRIGERATOR

CROSS-REFERENCE TO RELATED APPLICATIONS

This application is a Continuation Application of prior U.S. patent application Ser. No. 16/448,448, filed on Jun. 21, 2019, which is a Continuation of Ser. No. 15/310,043 filed Nov. 9, 2016, which is a U.S. National Phase Application under 35 U.S.C. § 371 of International Application PCT/KR2016/009413 filed on Aug. 25, 2016, which claims the benefit of Korean Application No. 10-2015-0119526 filed on Aug. 25, 2015, whose entire disclosure is/are hereby incorporated by reference.

BACKGROUND

1. Field

The present invention relates to a refrigerator, and more particularly, to a refrigerator including a door that is variably transparent so that the interior of the refrigerator is visible therethrough.

2. Background

In general, a refrigerator is an apparatus that discharges cool air generated by a refrigerating cycle involving a compressor, a condenser, an expansion valve, and an evaporator to lower the temperature in the refrigerator such that food is stored in a frozen state or in a refrigerated state.

A refrigerator generally includes a freezing compartment for storing food or beverages in a frozen state and a refrigerating compartment for storing food or beverages in a refrigerated state.

Refrigerators are classified into a top mount type refrigerator, in which a freezing compartment is disposed above a refrigerating compartment, a bottom freezer type refrigerator, in which a freezing compartment is disposed under a refrigerating compartment, or a side by side type refrigerator, in which a freezing compartment and a refrigerating compartment are disposed side by side. In all cases, doors are provided at the freezing compartment and the refrigerating compartment such that access to the freezing compartment and the refrigerating compartment is possible through the doors.

In addition to refrigerators in which a freezing compartment and a refrigerating compartment are partitioned from each other, there are also refrigerators in which access to a freezing compartment and a refrigerating compartment is possible through a single door. Most such single door type refrigerators are small-sized, and the freezing compartment is generally provided in a specific space inside the refrigerating compartment.

In addition, there is a French type refrigerator, in which an upper refrigerating compartment is opened and closed by left and right doors, as a kind of top mount type refrigerator. A freezing compartment of the French type refrigerator may also be opened and closed by left and right doors.

In recent years, the functions of the refrigerator have been diversified in addition to the original functions of the refrigerator, including storage of food in a frozen state or in a refrigerated state. For example, a dispenser may be mounted in the door of the refrigerator to provide clean water and ice, or a display unit may be mounted to the front of the door to display the state of the refrigerator such that the refrigerator can be appropriately controlled.

In general, the door of the refrigerator, which is provided to open and close the storage compartment, is opaque. That is, the door is provided as a heat insulation wall that defines the refrigerating compartment and the freezing compartment. However, the door is a heat insulation wall that can be opened and closed so that a user can access the refrigerating compartment or the freezing compartment. For this reason, it is not possible for the user to check the kinds and positions of goods stored in the storage compartment before the user opens the door.

The largest amount of cool air is lost when the door is opened. As the amount of time for which the door is open is increased, energy loss is further increased.

In general, various kinds of goods are stored in the refrigerating compartment or the freezing compartment. Consequently, it takes a predetermined amount of time for the user to find a desired item and take it out. That is, the user looks around the storage compartment to find a desired item in the state in which the door is open, which takes a considerable amount of time.

Such unique characteristics of the refrigerator cause user inconvenience and increase energy consumption.

In recent years, a refrigerator configured such that a portion of the storage compartment is openable has been proposed. That is, a refrigerator having a sub door for opening and closing a sub storage compartment provided in a main door has been proposed. The sub storage compartment is a portion of a main storage compartment. At least a portion of the sub storage compartment may be partitioned from the main storage compartment by a partition wall. The sub storage compartment may be provided in front of the main storage compartment. This type of refrigerator may be called a door in door (DID) refrigerator. When the sub door is opened, the leakage of cool air from the main storage compartment is somewhat reduced, thereby achieving an energy saving effect.

In the DID refrigerator, the user may open the main door to access the main storage compartment. The reason for this is that when the main door is rotated open, the sub storage compartment is also rotated together with the sub door.

For example, goods that are frequently used, such as beverages, may be stored in the sub storage compartment. The sub door may be opened, without opening the main door, in order to access the sub storage compartment.

Meanwhile, there is also a home-bar refrigerator having a home-bar door. A home bar may be a very small sub storage compartment. That is, the home-bar door, which is mounted in a portion of the main door, may be opened to store a small number of beverages in the home bar, which is provided in the rear of the main door.

A refrigerator having an enlarged home-bar may be considered a DID refrigerator.

In the DID refrigerator and the home-bar refrigerator, however, problems may be caused as the volume of the sub storage compartment is increased and the number of goods stored in the sub storage compartment is increased. That is, it takes a predetermined amount of time for the user to open the sub door or the home-bar door and to find a desired item and take it out, which causes user inconvenience and increases energy consumption.

BRIEF DESCRIPTION OF THE DRAWINGS

Embodiments will be described in detail with reference to the following drawings in which like reference numerals refer to like elements and, wherein.

DETAILED DESCRIPTION

Figure 1:
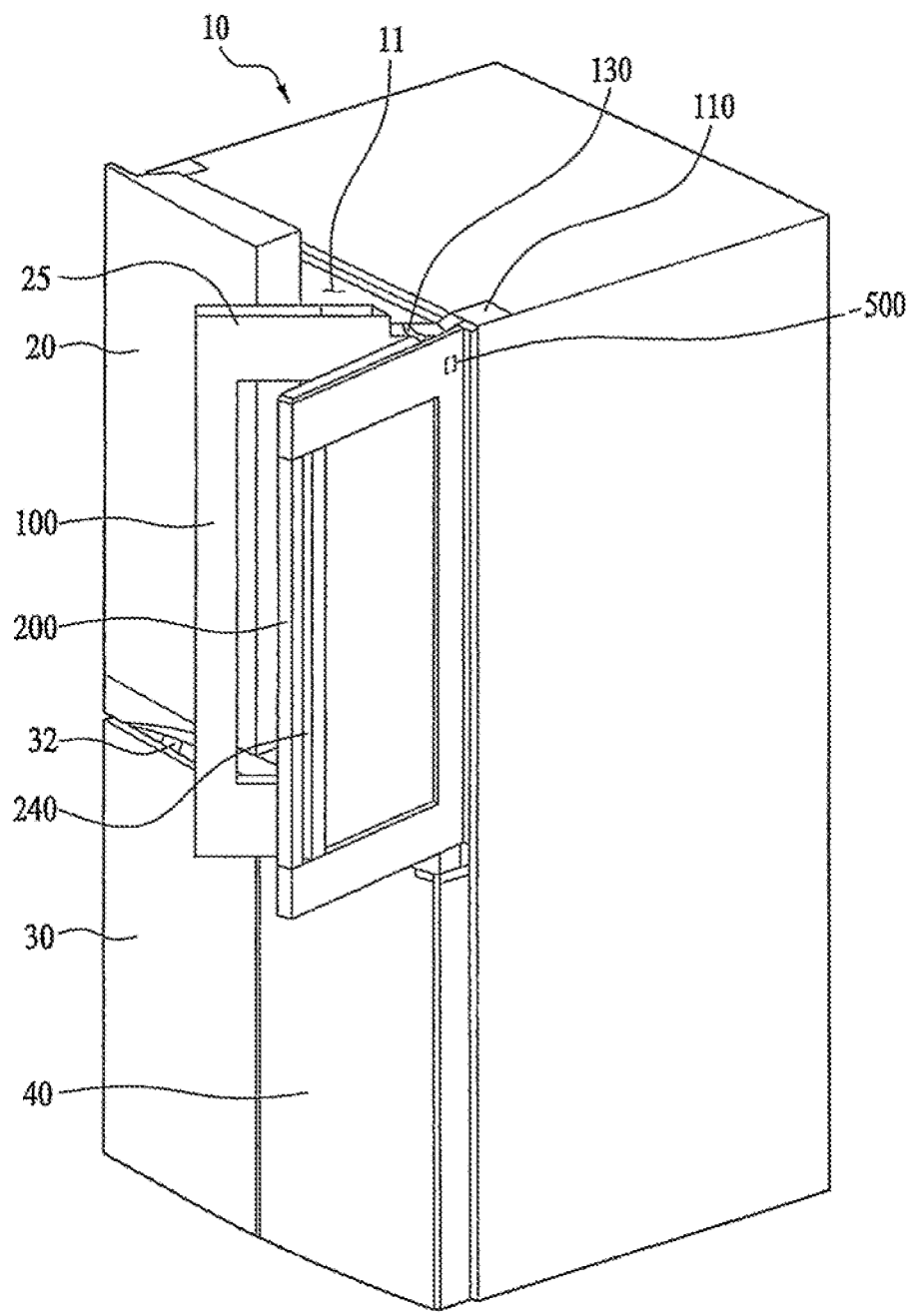
FIG. 1 is a perspective view showing a refrigerator according to a first embodiment of the present invention.

Hereinafter, preferred embodiments of the present invention will be described in detail with reference to the accompanying drawings.

Embodiments of the present invention are not limited to the types of refrigerators previously described. That is, a main door for opening and closing a refrigerating compartment or a freezing compartment may be a see-through door, or a sub door for opening and closing a sub storage compartment or a home-bar door may be a see-through door. Such a home-bar door may also be referred to as a sub door, since the home-bar door is hinged to the main door.

FIGS. 1 to 4 are views showing a refrigerator according to a first embodiment of the present invention.

The refrigerator shown is a bottom freezer type refrigerator in which a refrigerating compartment is provided in the upper part of a cabinet 10 and a freezing compartment is provided in the lower part of the cabinet. The refrigerating compartment and the freezing compartment may be portions of a storage compartment or a main storage compartment 11 provided in the cabinet 10.

As previously described, the present invention is not limited to this type of refrigerator. Any refrigerator having a door hinged to a cabinet for opening and closing a storage compartment of the refrigerator may be applied to the present invention.

In the embodiment shown, a left refrigerating compartment door 20 and a right refrigerating compartment door 25 are respectively hinged to the left and right sides of the cabinet 10. Alternatively, a single refrigerating compartment door may be hinged to the cabinet.

The left refrigerating compartment door 20 is an opaque door, at the lower end of which may be provided a handle. On the other hand, the right refrigerating compartment door 25 is configured to be selectively transparent such that the interior of the refrigerator compartment can be viewed through the right refrigerating compartment door 25. That is, the right refrigerating compartment door 25 may be a see-through door.

A left freezing compartment door 30 and a right freezing compartment door 40 may be respectively hinged to the left and right sides of the lower part of the cabinet 10 such that the left freezing compartment door and the right freezing compartment door are respectively provided under the left refrigerating compartment door and the right refrigerating compartment door. Alternatively, a single freezing compartment door may be hinged to the cabinet, or may be a drawer type door, which is separably mounted in the cabinet in the forward-rearward direction.

A handle groove 32 may be provided at the top surface of the left freezing compartment door 30, and a handle groove may also be provided at the top surface of the right freezing compartment door 40.

In the embodiment shown in FIG. 1, one of the doors is a see-through door. Alternatively, the doors of the refrigerator may be configured as see-through doors irrespective of whether to open and close the refrigerating compartment or the freezing compartment and whether to open and close the main storage compartment or the sub storage compartment.

As shown in FIG. 1, the right refrigerating compartment door 25 may include a main door 100 mounted to one side of the cabinet 10 so as to be turned about a main door hinge 110 and a sub door 200 mounted to the main door 100 or the cabinet 10 so as to be turned about a sub door hinge 130. That is, both the main door 100 and the sub door 200 may be opened to access the refrigerating compartment.

An opening may be provided in the inner middle part of the main door 100, and a sub storage compartment (not shown) may be provided at the rear of the main door 100.

The sub door 200 may be opened to access the sub storage compartment through the opening in the main door 100. That is, only the sub door 200 may be opened to access the sub storage compartment without opening the main door 100.

The sub storage compartment may be defined by mounting a plurality of baskets in the upward-downward direction. Specifically, a cover (not shown) for covering the baskets (not shown) may be provided. The cover may function as a partition wall for partitioning the sub storage compartment and the main storage compartment from each other. Consequently, the sub storage compartment may be located in front of the main storage compartment.

Figure 2:
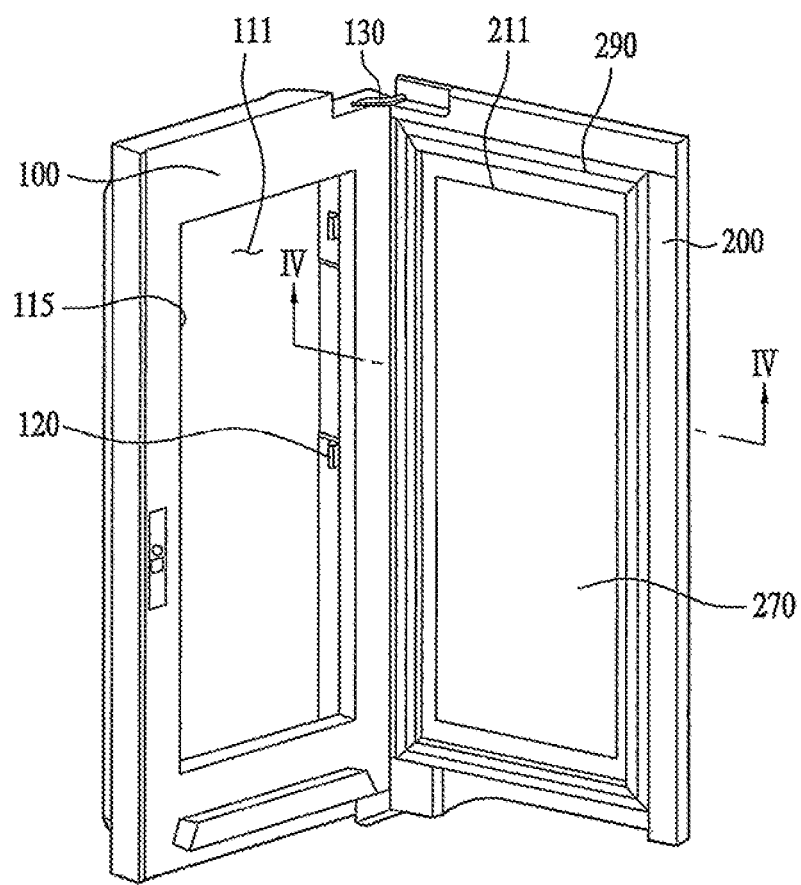
FIG. 2 is a perspective view showing a right refrigerating compartment door of FIG. 1.

As shown in FIG. 2, mounting protrusions 120 for mounting the baskets may be provided on the inner surface of the rear of the opening 115 of the main door 100. Two or three pairs of baskets may be mounted so as to be spaced apart from each other by a predetermined distance in the upward-downward direction. As shown in FIG. 2, therefore, the sub door 200 may be opened in the state in which the main door 100 is closed such that a user can access the sub storage compartment 111.

The relationship between the main door and the sub door and the relationship between the main storage compartment and the sub storage compartment are typical for a DID refrigerator, and thus a detailed description thereof will be omitted.

The sub door 200 is provided at the inside thereof with a panel assembly 270, which may be selectively transparent. As will be described later, the panel assembly may include a plurality of panels, although the panel assembly may be constituted by a single panel. The panel assembly 270 may be selectively seen through. The user may see the space inside the door through the panel assembly 270.

In the case in which the main door 100 and the sub door 200 are integrally formed to constitute a single door, unlike what is shown, the main storage compartment may be seen through the panel assembly 270. In this case, the main door 100 may be the cabinet itself, and the sub door 200 may be a door for opening and closing the storage compartment.

The sub door 200 may be provided at the left side of the panel assembly with a groove-shaped handle 240. The handle 240 may extend in the upward-downward direction, and may have a length equal to the height of the panel. Of course, the sub door 200 may be a left sub door provided at the left side of the cabinet 10. In this case, the handle 240 may be formed on the opposite side.

In addition, the rotational direction of the sub door 200 may be identical to that of the main door 100. That is, as shown in FIG. 2, the main door 100 and the sub door 200 may be provided so as to be rotated about a vertical rotary shaft. Alternatively, the sub door 200 may be provided so as to be rotated about a horizontal rotary shaft, as in the home-bar door.

In general, a door switch (see FIG. 12) for sensing opening and closing of the door is provided at the front of the cabinet of the refrigerator, and an illumination device (see FIG. 12) for illuminating the interior of the storage compartment when the door is opened is provided in the storage compartment.

In refrigerators according to embodiments of the present invention, the door may be changed to a see-through door when the illumination device is operated. That is, the door may be changed to a see-through door such that the interior of the door can be seen when the illumination device provided in the main storage compartment and/or the sub storage compartment is operated.

That is, the interior of the door cannot be seen when the illumination device is not operated, and the interior of the door can be seen when the illumination device is operated. In particular, the panel assembly may appear to be a black panel when the illumination device is not operated. The change to the see-through door may be performed by user input.

A control method and configuration related to the change to the see-through door will be described later.

The structure of the sub door 200 will be described in detail with reference to FIGS. 3 and 4. As previously described, the sub door 200 may be the main door itself for opening and closing the storage compartment. In the case in which the sub door is hinged to the main door, as shown in FIG. 1, the sub door 200 may be provided so as to overlap the main door 100. That is, the front of the sub door 200 may overlap the front of the main door 100. At this time, the front of the sub door 200 may constitute the front of the main door 100 and may thus constitute the front of the refrigerator.

The sub door 200 includes a door frame 205, which has an opening formed in the inner middle part thereof. The door frame 205 defines the edge of the sub door 200. That is, the door frame defines the upper, lower, left, and right sides of the edge of the sub door 200.

Specifically, the door frame 205 may include an external door part 210 that defines the front edge of the door and a door liner 280 that defines the rear edge of the door, the door liner having an opening formed in the inner middle part thereof. The external door part 210 and the door liner 280 may have openings that correspond to the opening 211.

In addition, the door frame 205 may include cap decoration parts 260 coupled to the upper and lower ends of the external door part 210 and the door liner 280. The external door part 210, the door liner 280, and the cap decoration parts 260 may constitute a door frame 205 having a space defined therein while having a thickness in the forward-rearward direction.

In conventional refrigerators, foam for insulation is injected into a space defined by the external door part 210, the door liner 280, and the cap decoration parts 260. In this embodiment, however, the door frame 205 may include a panel assembly 270. That is, the panel assembly 270 may be included in the door frame 205 in order to selectively form a see-through door. As will be described later, the panel assembly 270 may have a heat insulation function.

The panel assembly 270 may be provided at the middle part of the sub door 200. In particular, the panel assembly 270 may be provided so as to correspond to the opening in the door frame 205.

In order to mount the panel assembly 270, the door frame 205 may further include an inner frame 230 provided between the external door part 210 and the door liner 280. The inner frame 230 may be provided in the middle part thereof with an opening, which corresponds to the opening 211 in the door frame 205.

The door frame 205 may further include a door decoration part 220. The door decoration part 220 may be mounted in the opening in the door frame 205 so as to substantially define the opening 211 in the door frame 205.

The sub door 200 may include an upper hinge bracket 254 and a lower hinge bracket 256 for rotatable mounting, in addition to the panel assembly 270. The sub door 200 may include a handle 240 for allowing the user to open and close the sub door 200 while holding the handle and a gasket 290 for sealing. In addition, the sub door 200 may further include supports 250.

Hereinafter, a method of assembling the sub door 200 will be described with reference to FIG. 4.

First, the door decoration part 220 is assembled to the external door part 210, and then the handle 240 is assembled. A handle support 245 may be interposed between the handle 240 and the external door part 210 or the door decoration part. The handle support may be made of a metal, and may be formed in a bar shape so as to increase the rigidity of the handle 240. The door decoration part 220 may be coupled to the rear of the external door part 210. In this embodiment, the handle 240 may be coupled to the left end of the external door part 210, as shown in FIG. 4.

Subsequently, the inner frame 230 is assembled to the rear of the external door part 210, and the supports 250 and the hinge brackets 254 and 356 are assembled.

The supports 250 may include an upper support and a lower support. The supports 250 may be formed so as to correspond to the four upper, lower, left, and right corners of the opening 211. The supports 250 are provided so as to correspond to four corners of the panel assembly 270 in order to protect the panel assembly. That is, the supports support the panel assembly such that the weight of the panel assembly is uniformly distributed to the door frame 205.

In addition, the hinge brackets 254 and 256 are coupled to the supports 250. Consequently, the supports 250 may also function to increase the rigidity of the hinge brackets.

Subsequently, the cap decoration parts 260 are coupled to the rear of the external door part 210. The cap decoration parts 260 may be inserted into the upper and lower parts of the external door part 210 so as to be coupled to the external door part 210.

Subsequently, the panel assembly 270 may be coupled to the external door part 210 at the rear of the external door part 210, and the door liner 280 may be coupled to the rear of the external door part 210. The door liner 280 may be fixed to the external door part 210 using screws.

Finally, the gasket 290 is mounted to the rear of the door liner 280, whereby the assembly of the sub door 200 is completed.

The sub door hinge 130 may be coupled to the upper hinge bracket 254 and the lower hinge bracket 256. When the sub door 200 is coupled to the main door 100, the gasket 290 seals the gap therebetween to prevent the leakage of cool air.

Figure 3:
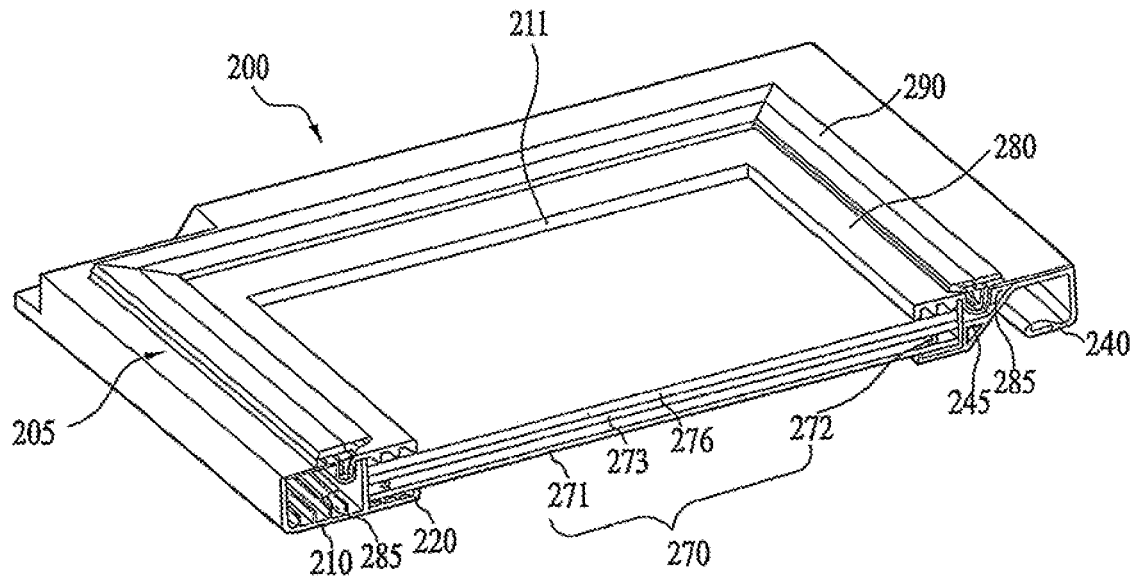
FIG. 3 is a perspective view taken along line IV-IV of FIG. 2.

As shown in FIG. 3, the panel assembly 270 may include a front panel 271 exposed to the front of the sub door 200. The front panel 271 may be made of a transparent material. A metal may be deposited on the rear of the front panel 271. The metal deposition layer makes the front panel 271 opaque in the state in which light is not transmitted through the metal deposition layer. On the other hand, the metal deposition layer makes the front panel 271 transparent when light is transmitted through the metal deposition layer.

Of course, the front panel 271 may have a color coating layer or may be formed as a colored panel. That is, the front panel may be opaque in the state in which light is weak, and may become transparent in the case in which light is strong.

This means that the front panel 271 is opaque when the illumination device at the rear of the front panel 271 is not operated and that the front panel 271 becomes a transparent panel when the illumination device is operated. Consequently, the interior of the storage compartment cannot be seen when the interior of the storage compartment is dark, and the interior of the storage compartment can be seen through the front panel 271 when the interior of the storage compartment is bright.

The panel assembly 270 may include a heat insulation panel provided at the rear of the front panel 271. A plurality of heat insulation panels may be provided. FIG. 3 shows an example in which two heat insulation panels are provided. Intermediate bars 272 may be provided between the heat insulation panels 273 and 276 and between the front panel 271 and the heat insulation panel 273.

The front panel 271 is made of a transparent material. The front panel is mounted in the opening formed in the middle part of the sub door 200 to constitute the front of the sub door 200.

The space in the door frame 205 of the sub door, excluding the panel assembly 270, may be filled with a heat insulation material. Specifically, a heat insulation material may be injected into a space between the external door part 210 and the door liner 280, i.e. a space 285 formed at the edge of the sub door, in order to prevent the leakage of cool air through the gap between the gasket 290 and the panel assembly 270.

Consequently, the edge of the sub door 200 is thermally insulated by the heat insulation material, e.g. polyurethane, and the middle part of the sub door 200 is thermally insulated by the heat insulation panels 273 and 276.

After the assembly of the sub door 200, foam is injected into the space 285 so as to securely couple the external door part 210 and the door liner 280 to each other.

The structure and manufacturing method of the panel assembly 270 will be described in detail hereinafter.

FIGS. 5 to 8 are views showing a refrigerator according to a second embodiment of the present invention.

Figure 5:
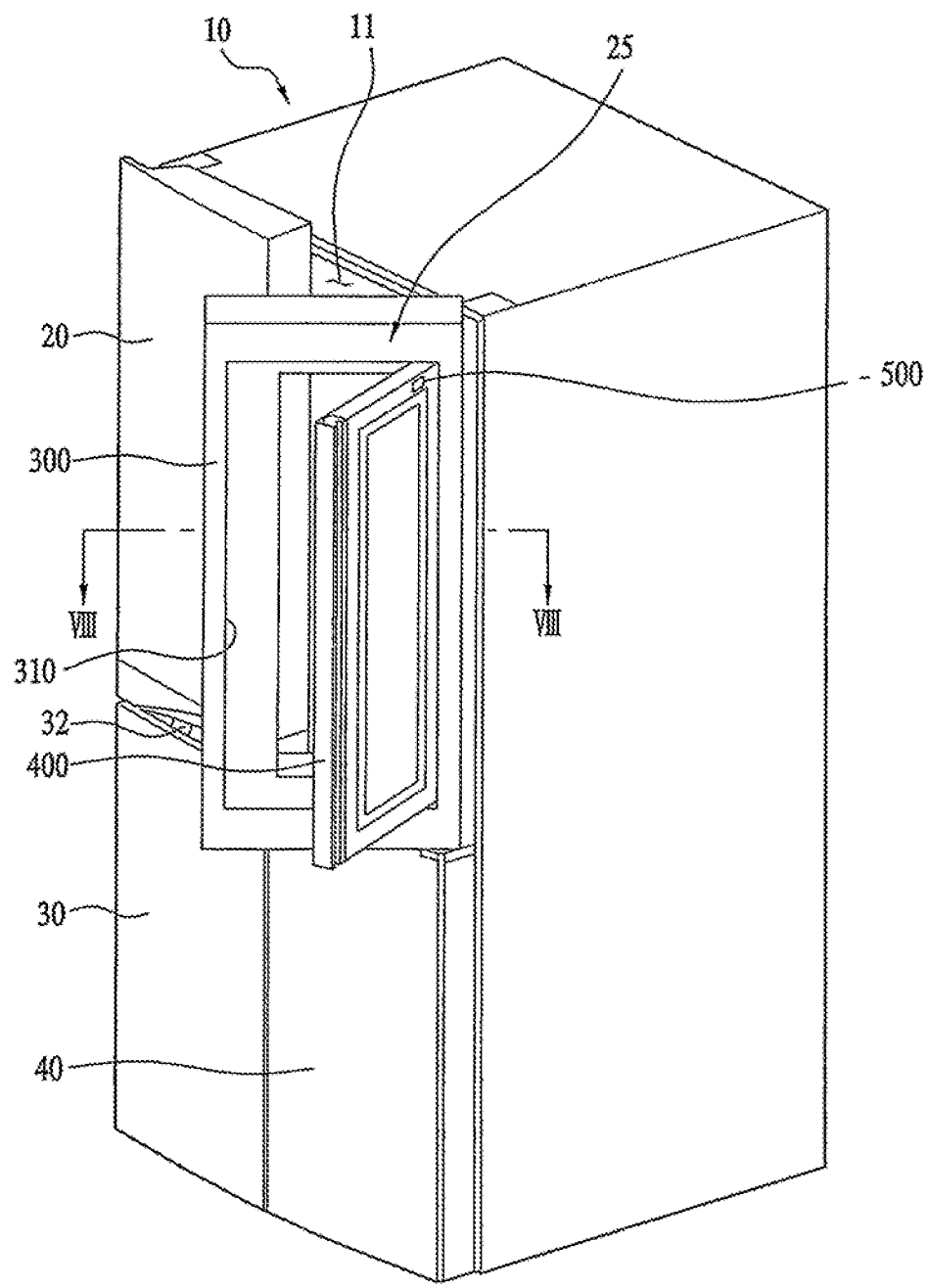
FIG. 5 is a perspective view showing a refrigerator according to a second embodiment of the present invention.
Figure 6:
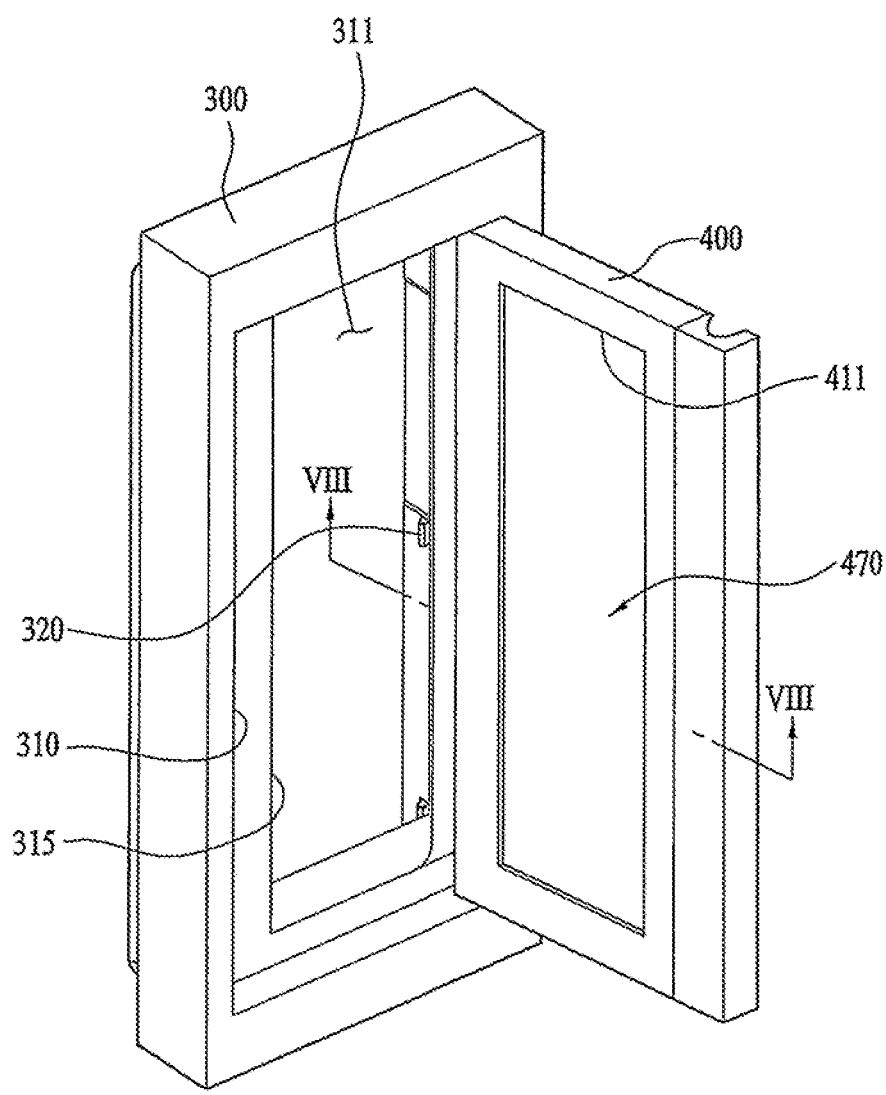
FIG. 6 is a perspective view showing a right refrigerating compartment door of FIG. 5.

In the refrigerator according to the second embodiment, as shown in FIGS. 5 and 6, a right refrigerating compartment door 25 includes a main door 300 hinged to the cabinet 10, the main door 300 being provided in the inner middle part thereof with an opening, and a sub door 400 hinged to the main door 300, the sub door 300 being inserted into the opening in the main door 300.

In the refrigerator according to the first embodiment, the sizes of the main door and the sub door are the same when viewed from the front, and the sub door may overlap the main door when the sub door is closed.

In the refrigerator according to the second embodiment, on the other hand, the size of the sub door 400 is smaller than that of the main door 300, and the sub door 400 is inserted into the opening 310 in the main door when the sub door is closed.

Specifically, in the previous embodiment, the sub door 200 is exposed to the outer front side of the main door 100 in the state in which the sub door is coupled to the main door, and, in this embodiment, the sub door 200 is inserted into the main door 100 in the state in which the sub door is coupled to the main door. The former may be referred to as an outside type sub door, and the latter may be referred to as an inside type sub door.

In this embodiment, the main door 300 may be the cabinet itself. In this case, the sub door 300 may be a door for opening and closing the storage compartment 11.

An opening 315 may be provided in the inner middle part of the main door 300, and a sub storage compartment 311 may be provided in the rear of the main door 300.

The sub door 400 may be opened to access the sub storage compartment 311 through the opening 315 in the main door 300. That is, the sub door 400 may be opened alone to access the sub storage compartment 311 without opening the main door 300.

The sub storage compartment may be defined by mounting a plurality of baskets in the upward-downward direction. Specifically, a cover (not shown) for covering the baskets (not shown) may be provided. The cover may function as a partition wall for partitioning the sub storage compartment and the main storage compartment from each other. Consequently, the sub storage compartment may be located in front of the main storage compartment.

As shown in FIG. 6, mounting protrusions 320 for mounting the baskets may be provided at the inner surface of the rear of the opening 315 in the main door 300. Two or three pairs of baskets may be mounted so as to be spaced apart from each other by a predetermined distance in the upward-downward direction. As shown in FIG. 6, therefore, the sub door 400 may be opened in the state in which the main door 300 is closed such that a user can access the sub storage compartment 311.

Meanwhile, in this embodiment, the main door 300 may be provided with two openings, which include an opening 315 for access to the sub storage compartment 311 and an opening 310 into which the sub door 400 is inserted. The opening 310 may be formed outside the opening 315.

The relationship between the main door and the sub door and the relationship between the main storage compartment and the sub storage compartment are typical for a DID refrigerator, and thus a detailed description thereof will be omitted.

The sub door 400 is provided at the inside thereof with a panel assembly 470, which may be selectively transparent. As will be described later, the panel assembly may include a plurality of panels, although the panel assembly may be constituted by a single panel. The panel assembly 470 may be selectively transparent. The user may see the space inside the door through the panel assembly 470.

That is, the sub storage compartment 311 may be seen through the panel assembly, which is provided in the opening 411 in the sub door 400, and through the opening 315, formed in the main door 300. The interior of the sub storage compartment 311 may be seen in the state in which the sub door 400 is closed such that the use can easily check the kinds and positions of goods stored in the sub storage compartment. Subsequently, the user may open the sub door 400, and may easily take desired goods out of the sub storage compartment.

Hereinafter, the structure of the sub door 400 will be described in detail with reference to FIGS. 7 and 8.

The sub door 400 includes a door frame 405, which has an opening 411 formed in the middle part thereof.

The door frame 405 may include an inner frame 410 that defines the edge of the sub door 400 at the rear of the sub door 400 and a door liner 480 that defines the rear edge of the sub door, the door liner 480 being coupled to the inner frame 410.

Unlike the first embodiment, the cap decoration parts may not be coupled to the upper and lower ends of the inner frame 410 and the door liner 480, but may be integrally formed with the upper and lower ends of the inner frame 410 and the door liner 480.

In addition, supports 450 may be coupled to the upper and lower parts of the inner frame 410 and the door liner 480 therebetween.

An upper hinge bracket 454 may be coupled to one side of the upper support 450, and a lower hinge bracket 456 may be coupled to one side of the lower support 450. Sub door hinges may be coupled to the upper hinge bracket 454 and the lower hinge bracket 456.

Of course, unlike what is shown, the cap decoration parts may be coupled to the upper and lower ends of the inner frame 410 and the door liner 480, and an upper hinge (not shown) and a lower hinge (not shown) may be directly mounted to the cap decoration parts.

The door liner 480 may be provided in the rear thereof with a recess, into which a gasket 490 is inserted and mounted. When the sub door 400 is coupled to the main door 300, the gasket 490 seals the gap therebetween to prevent the leakage of cool air.

Figure 7:
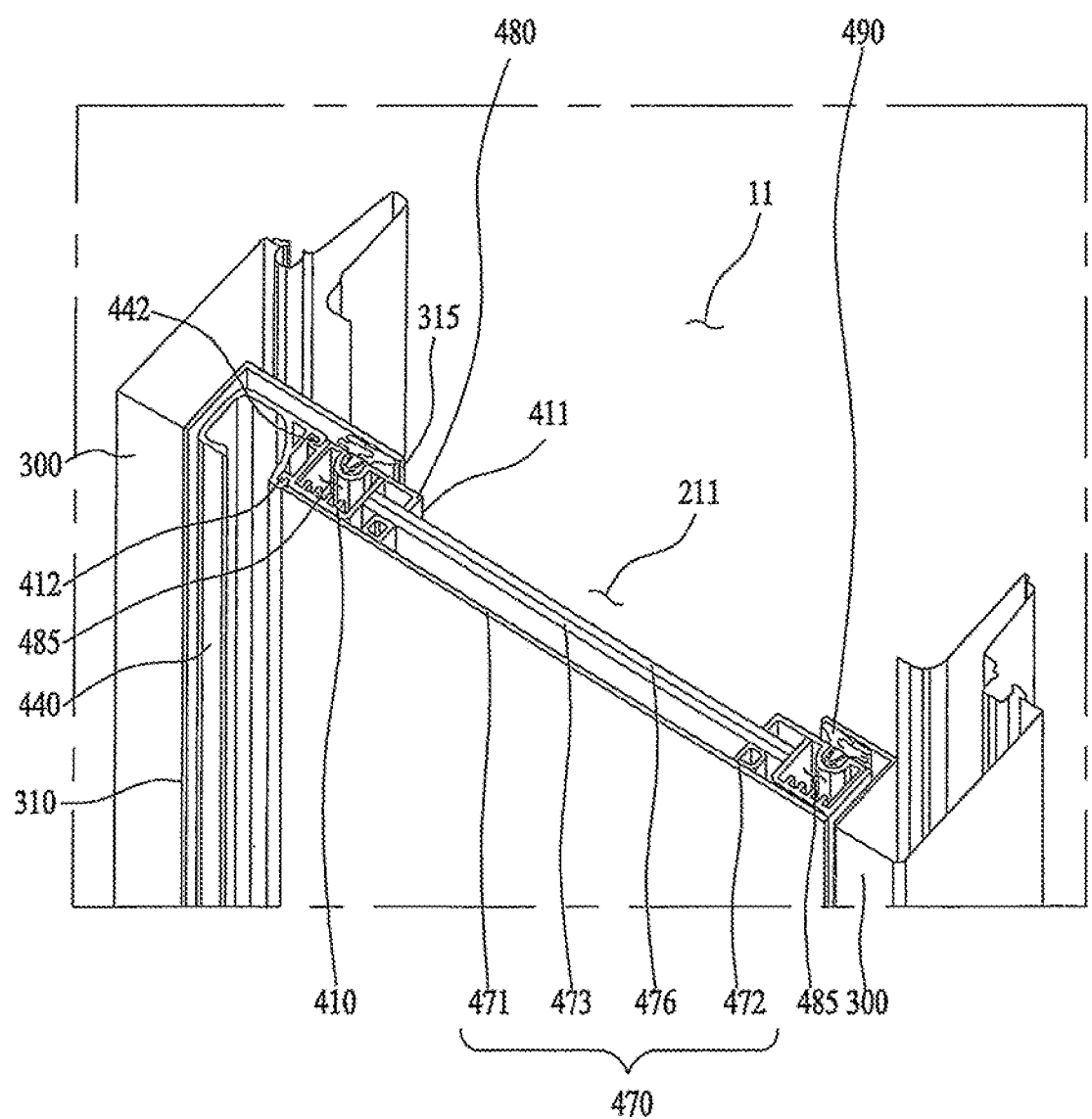
FIG. 7 is a perspective view taken along line VIII-VIII of FIG. 6.
Figure 8:
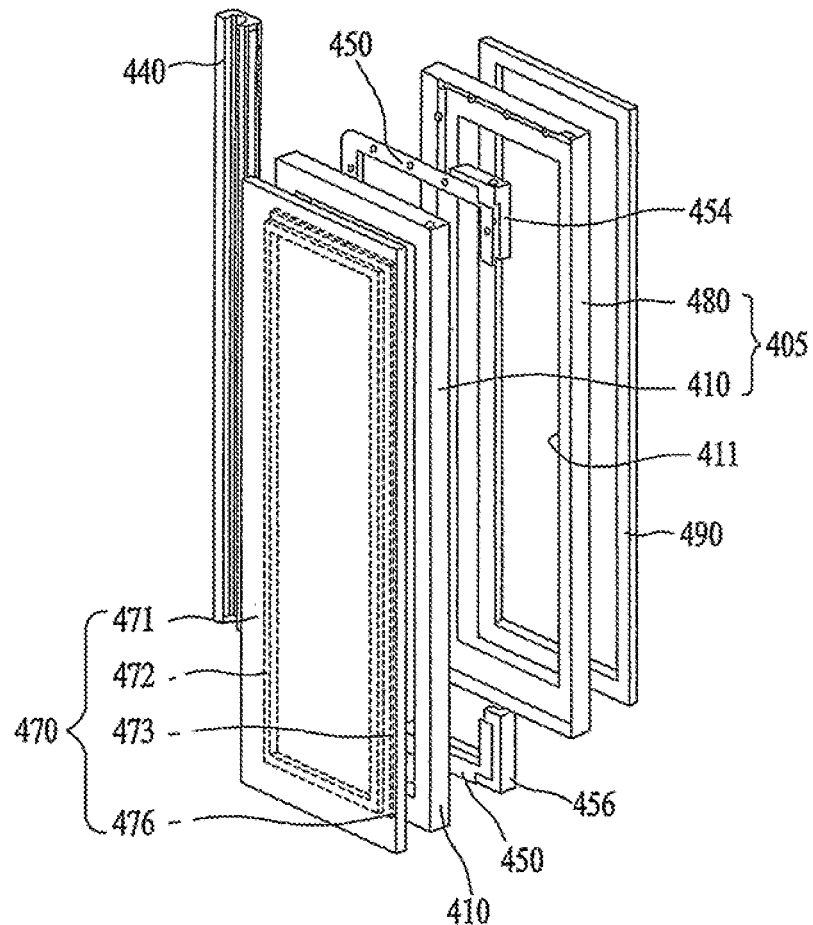
FIG. 8 is a perspective view showing a sub door of FIG. 6.

In the sub door 400 of the second embodiment, as shown in FIGS. 7 and 8, the panel assembly 470 is coupled to the front of the sub door 400. That is, the panel assembly 470 may be coupled to the inner frame 410 at the front of the inner frame 410.

The panel assembly 470 may be identical or similar to the panel assembly 270 of the previous embodiment. In this embodiment, however, the edge of a front panel 471 of the panel assembly 470 is not covered by the external door part 210, but is coupled to the front of the inner frame 410, which has an opening therein, unlike the first embodiment.

That is, in the previous embodiment, the edge of the front of the sub door is defined by the external door part 210, and the middle part of the front of the sub door is defined by the front panel 271. In this embodiment, however, the entirety of the front of the sub door may be defined by the front panel 471. That is, the edge and the middle part of the front of the sub door are defined by the front panel 271.

To this end, the front panel 471 may be formed so as to be larger than a plurality of heat insulation panels 473 and 476. That is, the front panel 471 may extend further outward so as to cover the heat insulation panels.

The heat insulation panels 473 and 476 may be inserted into the opening in the inner frame 410, i.e. the inner surface of the opening 411 of the sub door, and the rear surface of the second heat insulation panel 476 may be supported by the door liner 480.

An intermediate bar 472 having a rectangular section may be provided between the front panel 471 and the first heat insulation panel 473 in order to maintain a predetermined gap therebetween.

Meanwhile, a handle 440 may be coupled to the left side of the inner frame 410 and the door liner 480, which are coupled to each other.

In order to couple the handle 440 to the inner frame 410, the inner frame 410 may be provided at the left side thereof with a pair of catching ribs 412, which are engaged with a pair of coupling ribs 442 formed at the left side of the handle 440 so as to extend in the upward-downward direction.

The catching ribs 412 may protrude laterally from the left side of the inner frame 410, and may then be bent forward and rearward.

Correspondingly, the coupling ribs 442 may protrude laterally from the right side of the handle 440, and may then be bent rearward and forward.

As the result of the coupling between the inner frame 410 and the door liner 480, a predetermined space 480 is formed at the edge of the sub door 400. The space 480 may be formed as the result of the cap decoration parts being coupled to the inner frame 410 and the door liner 480. That is, the space 480 is formed at the upper, lower, left, and right sides of the edge of the sub door 400. The space is filled with a heat insulation material through a foaming process.

Consequently, the edge of the sub door 400 is thermally insulated by the heat insulation material, and the middle part of the sub door 400 is thermally insulated by the panel assembly 470.

The portion of the front panel 471 that is located outside the heat insulation panels in the radial direction thereof may be in tight contact with the inner frame 410. Of course, the front panel may also be in tight contact with the cap decoration parts, in addition to the inner frame 410. In the latter case, the upper and lower parts of the inner frame are formed by additional cap decoration parts.

First, after the handle 440 is coupled to the inner frame, the cap decoration parts may be coupled to the inner frame as needed. Subsequently, the panel assembly may be in tight contact with the front of the inner frame 410. The inner frame 410 and the panel assembly may be temporarily assembled using a piece of transparent tape or a transparent adhesive. That is, a piece of transparent tape may be attached to the rear surface of the edge of the inner frame 410 or the front panel 471 (i.e. the portion of the inner frame or the front panel that is located outside the heat insulation panels in the radial direction thereof).

After the panel assembly is temporarily assembled to the inner frame 410, the inner frame 410 and the door liner 480 may be coupled to each other at the rear of the inner frame 410. Subsequently, the space 485 is filled with foam such that the panel assembly is tightly fixed to the door frame 405.

Hereinafter, the structure and manufacturing method of the panel assembly will be described with reference to FIG. 9.

Figure 9:
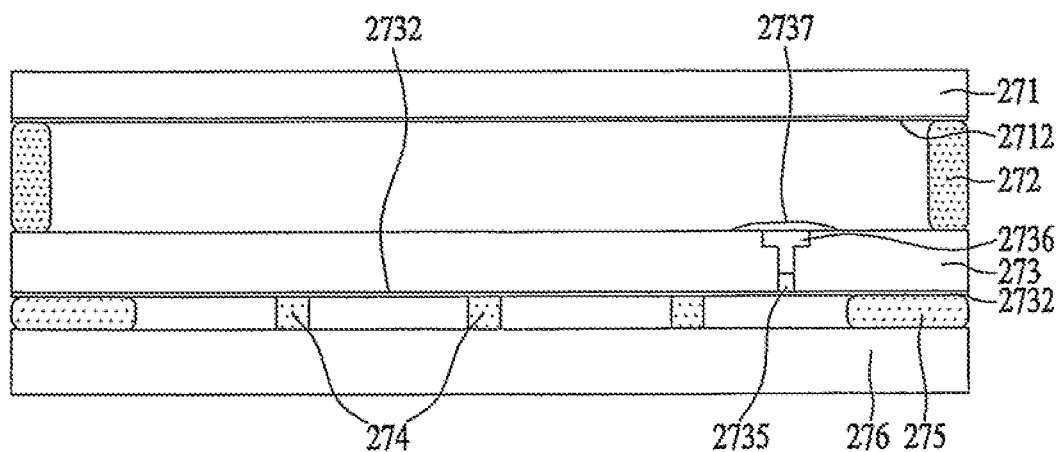
FIG. 9 is a sectional view showing the assembly of a front panel and a heat insulation panel in the manufacture of the sub door of the first embodiment.

FIG. 9 is a conceptual view showing the panel assembly 270 of the first embodiment, which may be identical to the panel assembly 470 of the second embodiment except that the size of the front panel 271 is equal to that of the heat insulation panels 273 and 276.

The front panel 271 may be thermally strengthened glass, which is formed by heating glass at a temperature of about 600 to 700 ☒ in order to increase the strength of the glass.

In the heat strengthening process, glass is heated to a glass transition temperature (Tg) or higher and is then rapidly cooled such that the glass has compressive stress formed due to the difference in shrinkage between the inside and the outside of the glass.

In the heat strengthening process, the depth of the compressive stress is about 20% the thickness of the glass.

A metal, such as titanium or nickel, may be deposited on the rear surface of the front panel 271 to form a deposition layer 2712. When the interior of the storage compartment is illuminated, the deposition layer 2712 allows light to be transmitted through the front panel 271 such that the interior of the storage compartment can be seen. When the interior of the storage compartment is not illuminated, the deposition layer 2712 prevents the interior of the storage compartment from being seen through the front panel 271. Of course, the front panel 271 may be made of colored glass, or may have a colored coating layer.

Consequently, the front panel 271 may become a see-through panel when light is transmitted through the front panel 271, and may become a black panel when light is not transmitted through the front panel 271. In addition, even when light is transmitted through the front panel 271, the transmitted light may become dim light, unlike transmission through normal glass. As a result, the atmosphere of the space in which the refrigerator is installed may be improved.

The first heat insulation panel 273 and the second heat insulation panel 276 may be chemically strengthened glass, which is formed by soaking glass in an electrolytic solution at a glass transition temperature or higher to chemically strengthen the glass.

In the chemical strengthening process, glass is heated to a glass transition temperature (Tg) or lower in an electrolytic solution having salt, such as KNO3, dissolved therein. As a result, some sodium ions on the surface of the glass are replaced with potassium ions, and compressive stress is formed in the glass due to the difference in radius between ions.

In the chemical strengthening process, the depth of the compressive stress may be about 2 to 3% the thickness of the glass.

A low-emissivity coating layer 2732 for reducing the transfer of heat into the storage compartment due to radiation may be provided at the rear surface of the first heat insulation panel 273.

Glass having a low-emissivity coating layer 2732 is called low-e glass. In general, silver is deposited on the surface of glass by sputtering to form a low-emissivity coating layer.

A vacuum space may be formed between the first heat insulation panel 273 and the second heat insulation panel 276. To this end, a hole 2735 for vacuum pumping may be formed through the first heat insulation panel 273.

A plug 2736 is inserted into the hole 2735 in order to close the hole 2735 after vacuum pumping.

A process of coupling the first heat insulation panel 273 and the second heat insulation panel 276 to each other and forming a vacuum heat insulation space therebetween will be described.

First, frit glass 275 is dispensed and arranged along the edge of the second heat insulation panel 276. The frit glass 275 is a glass material including glass powder having a melting point of about 400 to 500 ☒ and a binder. The frit glass has a melting point lower than that of the heat insulation panels 273 and 276.

After the frit glass 275 is arranged along the edge of the front of the second heat insulation panel 276, the first heat insulation panel 273 is placed on the second heat insulation panel 276, and heat is applied so as to melt the frit glass 275. After the frit glass 275 is solidified, the two heat insulation panels may be coupled to each other.

Meanwhile, a plurality of spacers 274 is arranged after the frit glass 275 is arranged and before the first heat insulation panel 273 is placed on the second heat insulation panel 276.

The spacers 274 prevent the middle parts of the heat insulation panels from curving, since there is a limitation on extent to which the thickness and strength of the heat insulation panels, which are made of glass, can be increased.

The spacers 274 may be made of stainless steel, glass, or plastic. The spacers 274 may be made of a material that is capable of preventing heat transfer due to conduction while maintaining the gap between the first heat insulation panel 273 and the second heat insulation panel 276.

After the first heat insulation panel 273 and the second heat insulation panel 276 are coupled to each other, vacuum pumping is performed through the hole 2735 to form a vacuum space therein.

After vacuum pumping, the plug 2736 is inserted into the hole 2735. Frit glass 2737 may be further melted on the first heat insulation panel so as to cover the plug. In this case, the plug 2736 may not protrude from the surface of the first heat insulation panel 273, and the melted frit glass may slightly convexly protrude from the surface of the first heat insulation panel.

The frit glass 2737 may have a melting point that is lower than that of the frit glass 275, which is disposed between the two heat insulation panels.

After the coupling of the first heat insulation panel 273 and the second heat insulation panel 276, vacuum pumping, and sealing are all completed, quadrangular intermediate bars 272 having a predetermined thickness are disposed on the front surface of the first heat insulation panel 273, and the front panel 271 is attached to the intermediate bars.

A transparent adhesive may be applied between the intermediate bars 272 and the first heat insulation panel 273 and between the intermediate bars 272 and the second heat insulation panel 276 in order to bond the intermediate bars to the first heat insulation panel and to bond the intermediate bars to the second heat insulation panel.

Figure 4:
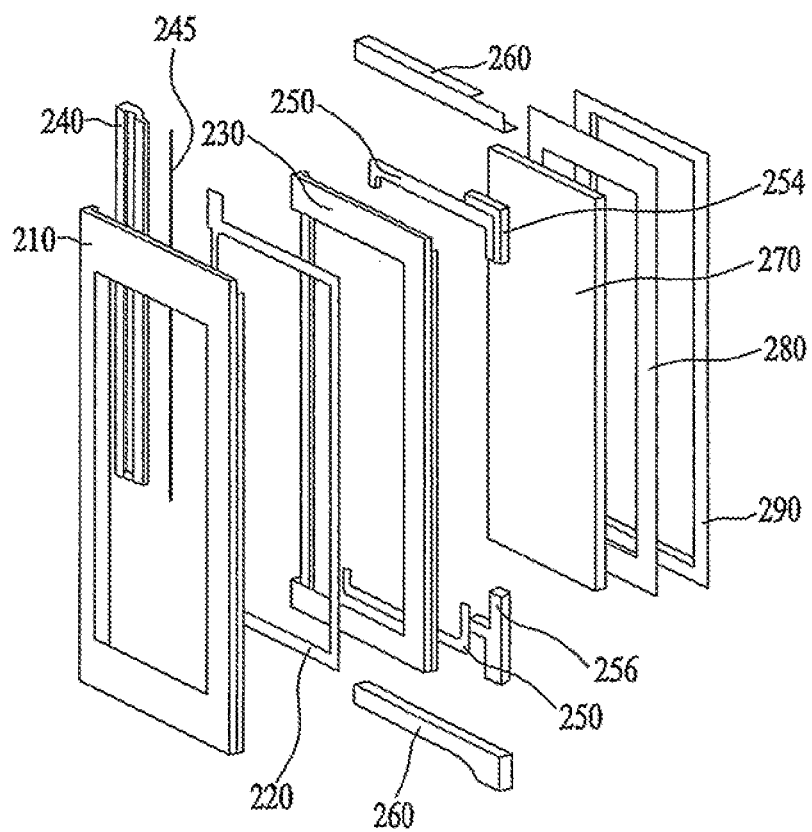
FIG. 4 is a perspective view showing a sub door of FIG. 2.

The panel assembly 270, manufactured as described above, is disposed between the external door part 210 and the door liner 280, and the external door part 210 and the door liner 280 are coupled to each other, as shown in FIG. 4, whereby the sub door 200 is completed.

In the second embodiment, the panel assembly 470 may be attached to the front of the inner frame 410 using a transparent adhesive. At this time, the first heat insulation panel 473 and the second heat insulation panel 476 are disposed in the opening in the inner frame 410, and the edge of the front panel 471 is attached to the front of the inner frame 410.

Meanwhile, a plurality of heat insulation panels, which are made of glass, are used, and a predetermined space for reducing heat transfer is formed between the heat insulation panels. Low-emissivity glass may be used to minimize heat transfer through the panel assembly 470.

The space may be in a vacuum state in order to effectively reduce heat transfer. As previously described, however, the space may not be easily formed, and the external appearance of the panel may be deteriorated by the vacuum hole. For this reason, a space that is filled with an inert gas, such as argon, may be formed instead of the vacuum space. An inert gas exhibits heat insulation properties superior to those of air. Consequently, a predetermined space that is filled with an inert gas may be formed between the front panel and a corresponding one of the heat insulation panels and between the heat insulation panels in order to obtain heat insulation effects.

As previously described, the main door or the sub door of each of the refrigerators according to the embodiments of the present invention may be selectively changed to a see-through door. Specifically, the main door or the sub door may be changed to a see-through door by a specific user input.

The change to the see-through door may be performed by operating the illumination device 600, which is provided in the storage compartment. When the illumination device 600 in the storage compartment is operated, the interior of the storage compartment is brightened. As a result, light in the storage compartment is transmitted through the door and is emitted to the outside such that a user can see the interior of the storage compartment from the outside. That is, the user input is input for operating the illumination device 600.

Meanwhile, the change to the see-through door may be performed by various kinds of user input. In addition, various kinds of sensors may be used to sense user input.

In this embodiment, the refrigerator may include a knock sensor module 500 (see FIG. 10) for sensing a user knock input for changing to the see-through door as a sound wave.

The knock sensor module 500 may be a sensor for sensing a sound wave transmitted through a medium. The knock sensor module 500 may be configured to sense user input in the case in which the sensed sound wave has a specific vibration pattern.

The knock sensor module 500 includes a microphone 510. This means that as long as a medium is continuous, the point at which the knock input is performed and the point at which the knock input is sensed may be spaced apart from each other. That is, this means that, in consideration of the total area of a general refrigerator door, the point at which the knock input is performed and the point at which the knock input is sensed may be maximally spaced apart from each other as long as the medium of the refrigerator door is continuous. In other words, this means that the point at which the knock input is performed and the point at which the knock input is sensed may be different from each other. In particular, this means that the knock input may be performed anywhere on a see-through region of the door. The reason for this is that the entirety of the see-through region of the door is formed of the same medium.

Here, the point at which the knock input is performed may be a point at which user input for changing to the see-through door is performed, and the point at which the knock input is sensed is a point at which the microphone 510 senses the input. Consequently, it is possible to use various input points and methods by the application of the knock sensor module 500 irrespective of the posture of the user or whether the user is holding an object in his/her hands. That is, the user generally performs a knock input using his/her finger in a comfortable posture, but the user may perform a knock input even while using an object held in his/her hand according to circumstances. In addition, knock input may be performed anywhere in a vertically long region such that the user can easily and conveniently perform knock input irrespective of the height of the user.

In this embodiment, it is possible for the user to perform input at any position on the front of the door by the application of the knock sensor module 500. In addition, the microphone may be flexibly located so as to correspond to any position of the door as long as the same medium is continuous between the point at which the knock input is performed and the point at which the knock input is sensed.

Meanwhile, an acceleration sensor for sensing the vibration of a medium, rather than a sound wave, may be used in order to sense the user knock input. That is, the acceleration sensor may sense dynamic force, such as acceleration, vibration, or impact, generated by a knock input performed on the front panel, and thereby determine that a predetermined knock input has been performed. The acceleration sensor may be classified as an inertia type acceleration sensor, a gyro type acceleration sensor, or a silicon semiconductor type acceleration sensor.

In the case in which the acceleration sensor is used, the point at which the knock input is performed and the point at which the knock input is sensed may be spaced apart from each other as long as the medium of the front panel is maintained uniform. However, the extent of attenuation of the vibration transmitted through the medium is increased as the distance between the point at which the knock input is performed and the point at which the knock input is sensed is increased, due to the characteristics of vibration. Even when knock inputs having the same intensity are performed, therefore, sensing errors may be increased as the distance between the point at which the knock input is performed and the point at which the knock input is sensed is increased.

Meanwhile, the refrigerator may vibrate when a refrigerating cycle is performed. In addition, the refrigerator may vibrate due to a very loud external noise or when a heavy object falls onto the floor on which the refrigerator is installed. The acceleration sensor may sense such external vibration as a knock input despite the space between the point at which the vibration is generated and the point at which the vibration is sensed and the discontinuity of the media. The reason for this is that such external vibration may cause vibration of the refrigerator. That is, such external vibration may vibrate the entirety of the door, particularly the front panel.

In this embodiment, therefore, a sound wave transmitted through a medium may be used instead of vibration of the medium itself or vibration transmitted through the surface of the medium. That is, a microphone, rather than an acceleration sensor, may be used.

Even though the medium in the front panel is a solid medium, which is different from air, a sound wave may be effectively transmitted a long distance due to the characteristics of the sound wave.

For example, a person can know that a train is coming from a long distance when the person places his/her ear on a railroad track. This means that a sound wave is effectively transmitted a very long distance through the medium of the railroad track.

In the acceleration sensor described above, in the same medium, the extent of attenuation of dynamic force is increased as the distance between the point at which an input is performed and the point at which the input is sensed is increased. On the other hand, the extent of attenuation of a sound wave is very small. Consequently, it is more effective to use a microphone that senses a knock input as a sound wave in consideration of the size of the refrigerator.

Consequently, the knock sensor module 500 senses a user knock input using a sound wave transmitted through the front panel. As a result, an additional device, such as a touch panel, need not be mounted to the front panel. This means that it is possible to prevent the occurrence of problems, such as the increase of cost, complexity, and the reduction of durability, attributable to the addition of the touch panel. In addition, this means that the knock input may be performed anywhere on the front panel. Consequently, an additional device for sensing the knock input may be omitted from the see-through region. That is, the microphone 510 may be located outside the see-through region, whereby the microphone is prevented from interfering with the see-through region.

In this embodiment, the front panel may be a medium through which a sound wave generated by a user knock input is transmitted, as previously described. That is, the user may perform a knock input on the front panel, which is exposed from the front of the door, and the microphone may sense a sound wave transmitted through the front panel.

In the case in which the microphone is used as a sensor for sensing a sound wave, the sound wave transmitted through the front panel is transmitted to the microphone via a new medium, e.g. air. Consequently, it is very important to isolate the sound wave transmission space between the medium and the microphone from the outside. The reason for this is that if such a shielding space or a hermetically sealed space is not provided, external noise may be input to the microphone. As will be described later, therefore, it is very important to tightly attach the microphone to the front panel and to maintain the tight contact therebetween. In addition, it is necessary to continuously apply force to a support member for supporting the microphone such that the support member is in tight contact with the front panel. That is, the support member may be tightly attached to the front panel.

In this embodiment, the user may perform knock input on the middle part of the door, which is changed to a see-through region, and the knock input may be sensed using the microphone provided at the edge of the door, which is not changed to a see-through region. Of course, the point at which the knock input is performed and the point at which the knock input is sensed are located in the continuous medium of the single front panel. The reason for this is that if the medium is changed, the extent of attenuation of a sound wave is increased, whereby sensing accuracy may be reduced.

On the other hand, this means that it is possible to reduce the possibility of an input applied to a medium other from the front panel being determined to be a normal knock input. That is, this means that it is possible to greatly reduce the possibility of determining that an impact applied to a part of the refrigerator other than the front panel is a normal knock input. The reason for this is that the cabinet of the refrigerator is generally not made of the same medium as the front panel.

Impact applied to the other parts of the refrigerator may be vibration of the refrigerator itself. The entirety of the refrigerator may vibrate due to various causes, such as the vibration of the refrigerator generated as the result of a refrigerating cycle being performed or the vibration of the refrigerator generated by external force applied to the refrigerator. In this case, the vibration of the refrigerator may be transmitted through the front panel, with the result that the vibration sensor may be affected. That is, if large vibration is generated despite the difference between media, the vibration sensor, which is provided at the front panel, may recognize the vibration as a normal knock input. In particular, the acceleration sensor may malfunction.

As described above, however, the extent of attenuation of a sound wave transmitted through the different media may be great if the quality of the media is not maintained. Consequently, a sound wave generated by impact applied to a part of the refrigerator other than the front panel (e.g. the cabinet) may be sufficiently attenuated while being transmitted through various kinds of media. In the case in which a sound wave is sensed and recognized as a knock input, therefore, it is possible to greatly reduce the possibility of impact or vibration applied to the part of the refrigerator other than the front panel being recognized as the knock input. That is, the microphone is less sensitive to the vibration of the refrigerator than the acceleration sensor. Consequently, it is possible to greatly reduce the possibility of vibration of the refrigerator being recognized as a normal knock input.

Figure 10:
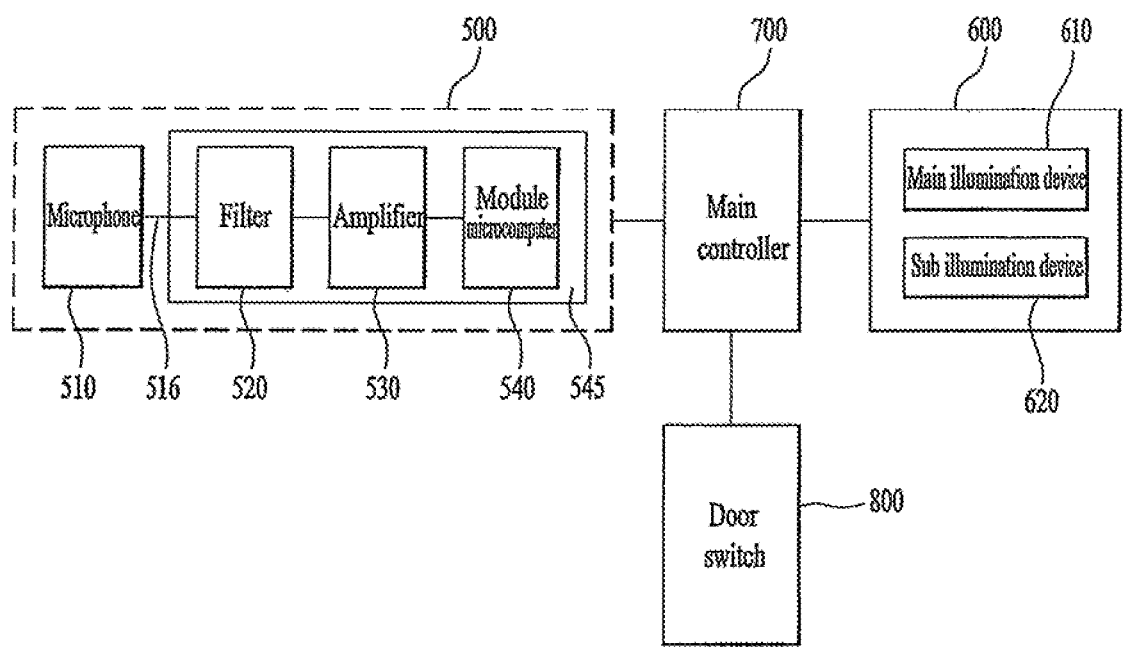
FIG. 10 is a block diagram showing a control configuration according to an embodiment of the present invention.

As shown in FIG. 10, the refrigerator according to this embodiment may include a knock sensor module 500, a main controller 700, and an illumination device 600.

The knock sensor module 500 may be provided at the front of the door, for example at the front panel 271 or 471 of the sub door 200 or 400, so as to sense a user knock input.

When the user normally inputs a knock signal for changing to a see-through door, the main controller 700 performs control such that the illumination device 600 is operated. Consequently, the interior of the storage compartment is brightened, whereby the change to the see-through door is performed.

Specifically, the knock sensor module 500 may include a microphone 510 for sensing a knock input as a sound wave. The microphone 510 may sense a sound wave transmitted through the medium of the front panel.

The microphone 510 may sense not only a sound wave generated by the user knock signal but also a sound wave generated by external noise. The latter sound wave or vibration may be noise. Consequently, it is necessary to prevent such noise from being introduced into the microphone 510. That is, it is necessary to prevent external noise from being transmitted to the microphone through the space between the front panel and the microphone.

To this end, the microphone 510 may be tightly attached to the medium. In particular, the microphone 510 may be tightly attached to the front panel 271 or 471. Consequently, a mounting member or a support member for tight attachment of the microphone 510 may be needed. Concrete embodiments of the mounting member or the support member will be described later.

The main controller 700 is a controller for performing general control of the refrigerator. The main controller may also be called a main microcomputer. That is, the main controller may be a controller for performing control such that a compressor or various fans are driven at a predetermined temperature.

Meanwhile, the refrigerator generally includes a door switch 800. Whether the door of the refrigerator is open or closed may be sensed by the door switch 800. When the door is opened, the door switch is turned on, with the result that an illumination device 610 in the storage compartment is operated. When the door is closed, the door switch is turned off, with the result that the illumination device 610 in the storage compartment is not operated. Of course, the door switch may be turned on and off in the opposite manner. The operation of the door switch 800 and the illumination device 610 may be performed irrespective of the controller 700. Of course, the controller 700 may check the closed and open states of the door through the door switch 800, and may control the illumination device 610 based thereon.

In this embodiment, the door switch 800, the main controller 700, and the illumination device 600 may be controlled in two aspects.

First, an example in which the main door is changed to a see-through door will be described.

The main controller 700 may operate the illumination device 600, particularly a main illumination device 610, for changing to the see-through door. The change to the see-through door may be performed on the premise that the main door is closed. Consequently, the main controller 700 may perform control such that the main illumination device 610 is operated even in the state in which the door switch 800 is on (in the state in which the door is dosed) based on the determination of a normal knock signal. In addition, the operation of the main illumination device 610 may be controlled through a see-through door change algorithm as long as the door is not opened. For example, the main illumination device may be controlled so as to be gradually brightened. In addition, the main illumination device may be controlled so as to be stopped after a predetermined amount of time. That is, the illumination device may be controlled so as to be turned off after a predetermined amount of time.

When the door is opened during the change to the see-through door, switching to a general control algorithm for controlling the main illumination device 610 may be performed. That is, the main illumination device 610 may be controlled so as to be continuously operated in the state in which the main door is open. Of course, control may be performed such that if the main door is open for an excessive amount of time, an alarm is generated, and the main illumination device 610 is turned off.

Next, an example in which the sub door, rather than the main door, is changed to a see-through door will be described. In this case, a sub illumination device 620 for illuminating the interior of the sub storage compartment may be provided in addition to the main illumination device 610, which illuminates the interior of the storage compartment.

Although not shown, the sub illumination device 620 may include an LED module mounted to one side or each side of the opening 115 or 215 of the main door 100 to illuminate the sub storage compartment. The LED module may include a plurality of LEDs arranged on a vertically long circuit board at predetermined intervals.

The LED module may be mounted in a groove formed in each side of the opening in the main door 100, and may be covered by a transparent cover, which protects the interior of the LED module and prevents moisture or foreign matter from being introduced into the LED module.

The main controller 700 may operate the sub illumination device 620 to change the sub door to the see-through door in response to a determination of a normal knock signal. At this time, the sub illumination device 620 may be controlled to be operated for a predetermined amount of time. Even when the user opens the sub door, the sub illumination device 620 may be controlled to be continuously operated within the predetermined amount of time.

On the other hand, the user may open the main door, rather than the sub door, within the predetermined amount of time. At this time, it is not necessary to maintain the state in which the sub door is changed to the see-through door. Upon sensing the opening in the main door through the door switch during changing of the sub door to the see-through door, therefore, the main controller 700 may perform control such that the operation of the sub illumination device 620 is stopped.

Consequently, it is possible to reduce unnecessary operation of the illumination device 600 based on the control relationship among the main controller 700, the illumination device 600, and the door switch 800.

The main controller 700 may determine whether a signal input through the knock sensor module 500 is a normal knock signal. That is, the main controller 700 may directly determine whether the input signal is a knock signal or noise. In this case, however, the main controller 700 may be overloaded, and the amount of noise in a signal line may be further increased due to the distance between the vibration sensor 500 and the main controller 700.

As previously described, the microphone 510 may be provided at the front panel 271 or 471. In many cases, however, the main controller 700 is generally provided at one side of the cabinet 10, rather than the door. As a result, the distance between the microphone 510 and the main controller 700 is increased, which means that the length of a signal line is increased. This means that a normal knock signal may be input to the main controller 700 in the state of having been deteriorated due to the noise in the signal line. As a result, a knock signal recognition rate may be reduced. In particular, the unit of a signal output from the microphone is mV, whereas the unit of a signal input to the main controller 700 is V. Consequently, it is not desirable for the main controller 700 to determine a knock input due to the difference in signal amplitude.

In particular, the refrigerator is an electronic device using high voltage and high current. Consequently, the amount of electrical noise that is generated is relatively large. This means that a signal having a unit of mV output from the microphone has low resistance to electrical noise.

In order to solve this problem, according to this embodiment, a microphone and a module microcomputer are modularized to constitute the knock sensor module.

The knock sensor module, denoted by reference numeral 500, may include a microphone 510 and a module microcomputer 540. As previously described, the microphone 510 may be a sensor for sensing a knock input, and the module microcomputer 540 may be provided to determine whether the knock input is a normal knock input based on the signals sensed by the microphone 510 and to generate a knock-on signal.

For example, upon determining that the knock input is a normal knock input, the module microcomputer 540 may transmit a signal indicating that a normal knock input has been performed (a knock-on signal) to the main controller 700. Upon determining that the knock input is not a normal knock input, the module microcomputer 540 may not transmit the knock-on signal to the main controller 700. For example, upon determining that the knock input is a normal knock input, the module microcomputer 540 may transmit a knock-on signal of 5 V to the main controller 700. Upon determining that the knock input is not a normal knock input, the module microcomputer 540 may transmit a signal of 0 V to the main controller 700. In the latter case, no signal is transmitted to the main controller.

The main controller 700 receives only the knock-on signal. Consequently, the main controller 700 does not perform any additional determination. As a result, it is possible to minimize the amount of noise in the signal line between the module microcomputer 540 and the main controller 700. In the same manner, the module microcomputer 540 may receive a signal having minimized noise through the modularized microphone to determine whether knock-on has been performed. Consequently, it is possible to secure a recognition rate with high accuracy.

Meanwhile, the knock sensor module 500 may include a filter 520. The filter 520 may remove noise from a signal received from the microphone 510. Specifically, the filter 520 may be a DC noise filter. The filtered signal may be amplified by an amplifier 530. Consequently, the knock sensor module 500 may further include an amplifier 530 for amplifying the filtered signal and transmitting the amplified signal to the module microcomputer 540. Specifically, the amplifier 530 may be an OP amplifier.

In the knock sensor module 500, the filter 520, the amplifier 530, and the module microcomputer 540 may be mounted on a single printed circuit board (PCB) 545, and the microphone 510 may be connected to the PCB 545 via a signal line 516. Consequently, the knock sensor module 500, particularly the PCB 545, may be configured to be smaller than the main controller 700. This means that the PCB 545 may be mounted at a position adjacent to the position at which the microphone 510 is mounted. Consequently, the length of the signal line 516 between the microphone 510 and the PCB 545 may be relatively short. This means that it is possible to effectively prevent noise from being introduced through the signal line 516.

A structure in which the microphone 510 is mounted or fixed will be described later.

Hereinafter, a microphone or a microphone module will be described in detail with reference to FIG. 11.

Figure 11:
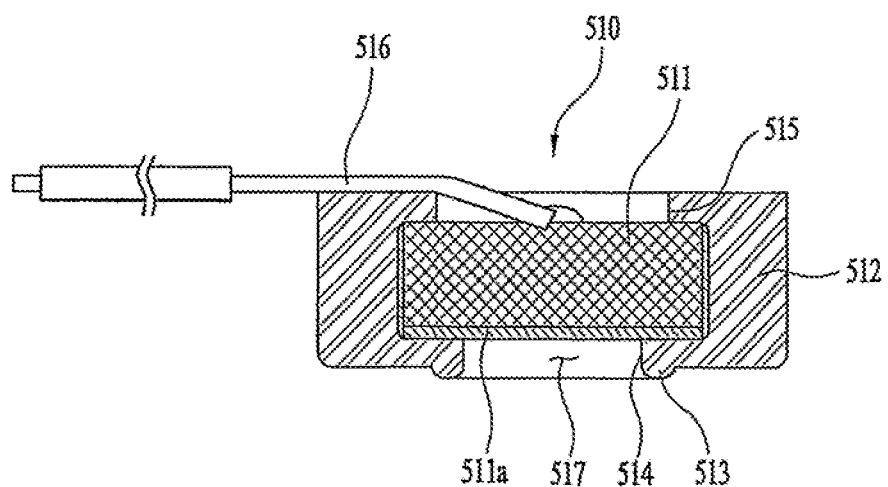
FIG. 11 is a sectional view showing a microphone module applicable to an embodiment of the present invention.

As shown in FIG. 11, a microphone may be provided as a microphone module 510. That is, a microphone 511 for directly sensing a sound wave may be received in a microphone receiving part 512. The assembly of the microphone 511 and the microphone receiving part 512 may be referred to as a microphone module 510, or simply as a microphone 510.

The microphone 511 may be formed in a circular shape having a predetermined thickness. The microphone 511 may be received in the microphone receiving part 512. The movement of the microphone 511 is limited by the internal shape of the microphone receiving part 512. That is, the microphone may be supported so as to be suspended in the microphone receiving part 512.

The microphone receiving part 512 may be made of an elastic material, such as rubber. Basically, the microphone 511 may tightly contact the microphone receiving part 512. The microphone receiving part 512 may be provided in the upper and lower ends thereof with openings 514 and 515. The openings may be circular.

Figure 13:
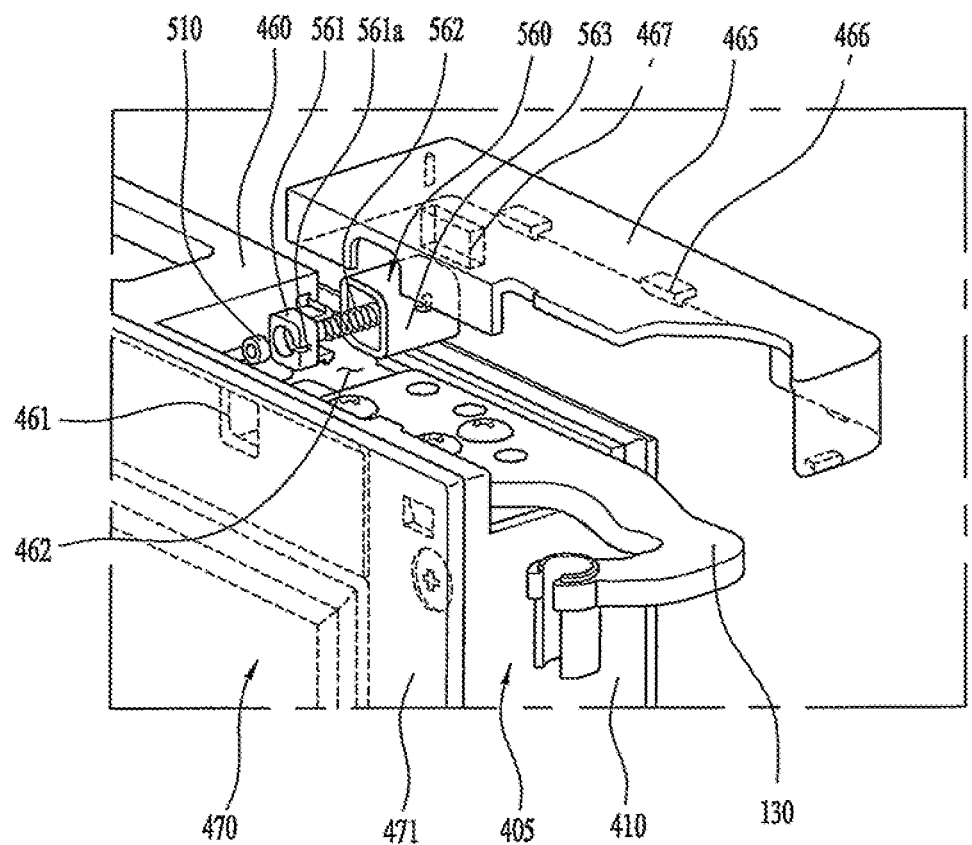
FIG. 13 is a partial perspective view showing a structure in which a vibration sensor (a microphone module) is mounted to the sub door of the second embodiment.

One surface of the microphone 511 may be a sound wave receiving part 511a, which may be directed toward a specific one of the openings. For the sake of convenience, the sound wave receiving part 511a is directed toward the lower opening 514, as shown in FIG. 13.

The signal line 516 is connected to the other side of the microphone 511. As previously described, the signal line 516 may be connected to the PCB 545 through the opening 515.

A predetermined space may be formed between the lower opening 514 and the sound wave receiving part 511a. The space may be sealed. The lower opening 514 may come into tight contact with the medium, e.g. the front panel 271 or 471, so as to seal the space 515.

The space 517 may be isolated from the upper opening 515 as the result of tight contact between the microphone 511 and the microphone receiving part 512.

In order to prevent damage to the tight contact space due to eccentricity, a protrusion 513 may be formed along the circumference of the lower opening 514. That is, the sealed space may be effectively maintained due to elastic deformation of the protrusion 513 even when deviation of force pushing the microphone 511 so as to tightly contact the microphone receiving part 512 is generated later.

Consequently, one side of the tight contact space is sealed by the medium. A sound wave transmitted through the medium may be received by the microphone 511 through air in the space.

The introduction of external noise or vibration into the space is minimized due to the sea. As a result, it is possible to greatly reduce errors in knock-on determination due to external noise and malfunction and to very accurately secure a knock-on recognition rate. That is, accuracy in determining a knock-on input as knock-on when the knock-on input is performed may be remarkably improved.

Hereinafter, a structure in which the vibration sensor is mounted will be described in detail. In particular, in the microphone module 510 shown in FIG. 11, a structure in which the vibration sensor is mounted will be described in detail. For the sake of convenience, the signal line 516 is not shown.

First, an embodiment of a structure in which the microphone module 510 is mounted will be described with reference to FIG. 12.

This embodiment may be applied to an embodiment in which the front panel 271 defines the middle part of the door or the sub door and the edge of the door or the sub door is defined by the door frame 205.

Figure 12:
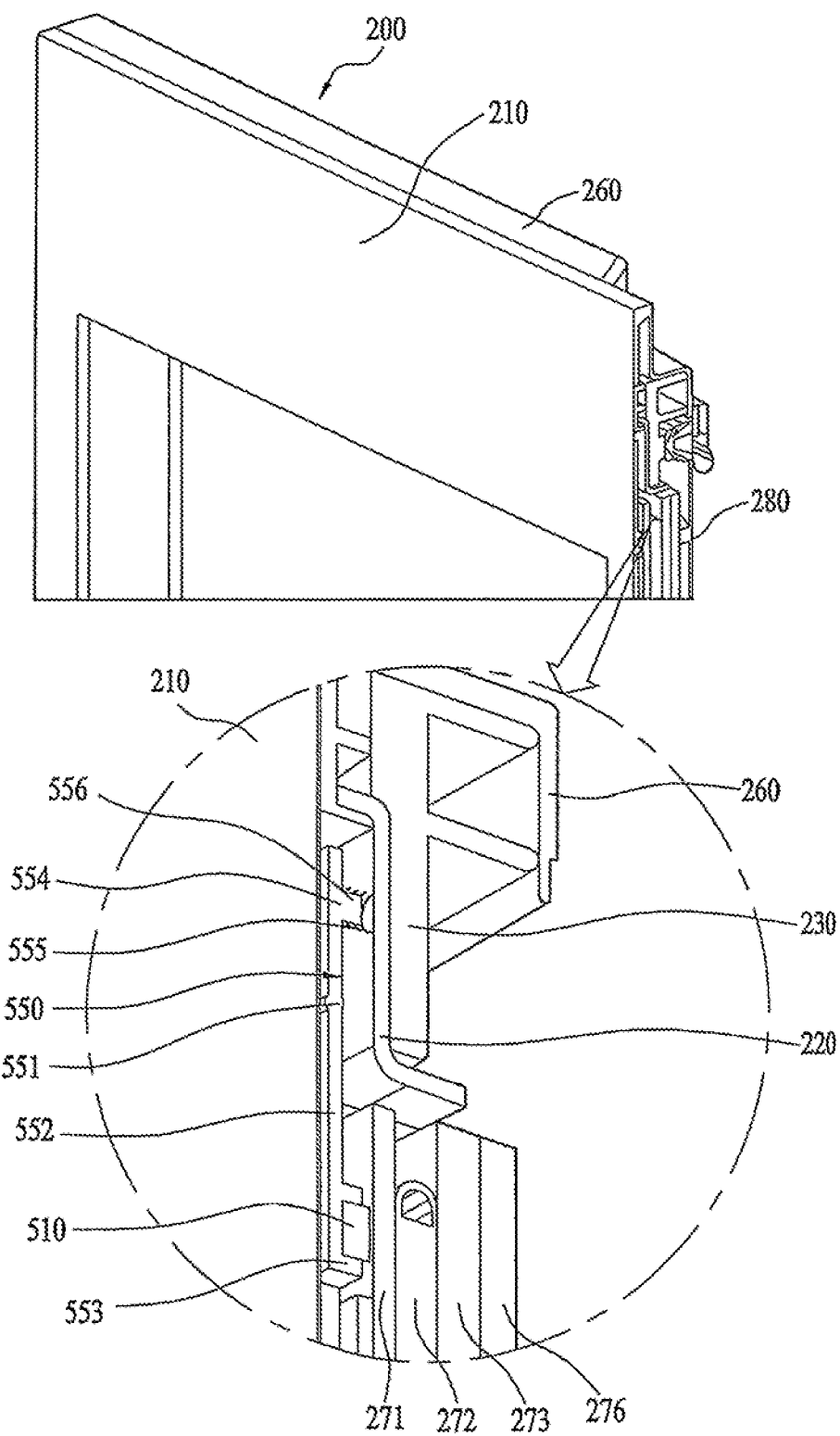
FIG. 12 is a partially cutaway perspective view showing a structure in which a vibration sensor (a microphone module) is mounted to the sub door of the first embodiment.

Specifically, FIG. 12 is a partially cutaway perspective view and an enlarged view showing a structure in which the microphone module 510 is mounted to the sub door. In the enlarged view, the door liner 280 is not shown for the sake of convenience.

According to this embodiment, the microphone module 510 may be tightly mounted to the front panel 271.

As shown, the edge of the front panel 271 is covered by the door frame 205, particularly the external door part 210. The microphone module 510 is disposed between the external door part 210 and the front panel 271. The microphone module 510 may be tightly mounted to the front panel 271.

Specifically, a support member 550 for tightly mounting the microphone module 510 to the front panel 271 may be provided. The support member 550 may be provided between the external door part 210 and the front panel 271.

In addition, the support member 550 may be provided between the external door part 210 and the door decoration part 220.

Consequently, the microphone module 510 or the support member 550 may be provided outside the opening 211 in the see-through door in the radial direction. As a result, the microphone module 510 and the support member 550 may not be visibly exposed from the front of the door irrespective of changes to the see-through door. In addition, the external appearance of the door is aesthetically improved since the microphone module and the support member are not visibly exposed.

Specifically, the support member 550 may include an elastic member 555. The elastic member 555 may generate elastic force in the direction in which the microphone module 510 is tightly attached. Consequently, force may be continuously applied to the microphone module 510 in the direction in which the microphone module 510 is tightly attached.

The support member 550 may include a rotary shaft 551, a first extension part 552 extending from one side of the rotary shaft 551, and a second extension part 554 extending from the other side of the rotary shaft 551. The rotary shaft 551 may be mounted between the external door part 210 and the door decoration part 220.

The first extension part 552 may be provided with a holder 553. The holder 553 may be provided at the rear of the first extension part 552. In addition, the microphone module 510 may be mounted in the holder 553.

The elastic member 555 may be mounted between the second extension part 554 and the door decoration part 220. The elastic member generates elastic force for pushing the second extension part 554 forward. The elastic force is converted into force for pushing the first extension part 552 rearward like a seesaw. As a result, the microphone module 510 comes into tight contact with the front panel 271 through the holder 553. Consequently, force is continuously applied through the elastic member 555 in the direction in which the microphone module 510 comes into tight contact with the front panel 271.

If the sub door 200 does not include the door decoration part 220 and the inner frame 230, the support member 550 may be mounted between the external door part 210 and the door liner 280. In any case, therefore, the support member may be located outside the opening in the door frame 205 in the radial direction.

The elastic member 550 may be a spring, and a protrusion for supporting the elastic member 550 may be provided at the rear of the second extension part 554.

Specifically, the elastic member 550 may be compressed to a predetermined length during assembly to generate elastic force for pushing the second extension part 554.

Since the elastic member 550 pushes the second extension part 554, the first extension part 552, which is located at the opposite side of the rotary shaft 551, pushes the microphone module 510 such that the microphone module 510 comes into tight contact with the front panel 271. That is, the state in which the microphone module 510 is tightly attached to the front of the front panel 271 may be continuously maintained.

Consequently, the microphone module 510 may effectively recognize that the user knocks the front panel 271.

Hereinafter, another embodiment of the structure in which the microphone module 510 is mounted will be described with reference to FIGS. 13 and 14.

In this embodiment, the microphone module 510 may be tightly attached to the front panel, in the same manner as in the previous embodiment. In addition, the microphone module 510 may be mounted to the door frame such that the microphone module 510 does not interfere with the see-through door.

The structure in which the microphone module 510 is mounted according to this embodiment may be applied to the door shown in FIG. 6. That is, the structure according to this embodiment may be applied to the case in which the front panel 471 forms the entire external appearance of the front of the door.

Specifically, the structure according to this embodiment may be applied to a door characterized in that a heat insulation panel is inserted into an opening and the rear edge of a front panel is tightly attached to a door frame.

As previously described, the door frame 405 may include an inner frame 410. The inner frame 410 may be integrally formed with cap decoration parts 460, or the cap decoration parts 460 may be coupled to the upper and lower parts of the inner frame 410.

Figure 14:
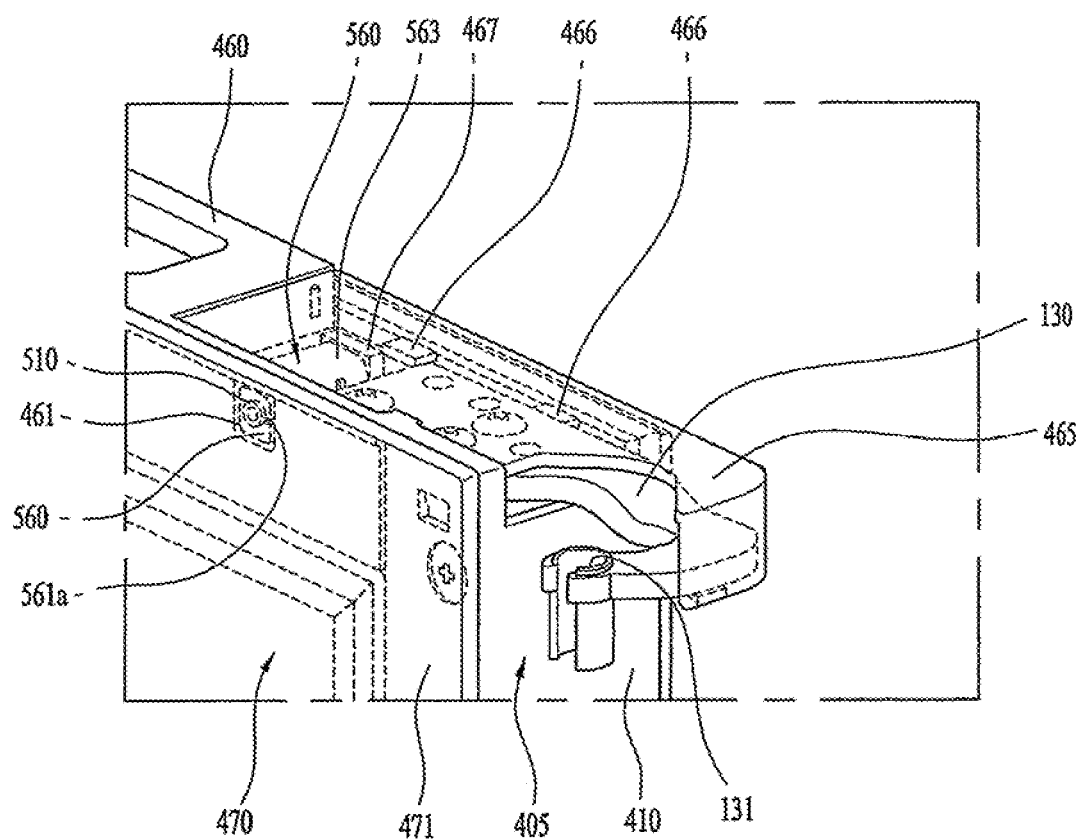
FIG. 14 is a perspective view showing the structure shown in FIG. 13.

In FIGS. 13 and 14, the microphone module 510 is mounted through the cap decoration part 460 located at the upper part of the door.

More specifically, the cap decoration part 460 may be provided in the front thereof with a through hole 461, through which the microphone module 510 extends. The microphone module 510 may extend through the through hole 461 so as to be tightly attached to the front panel 471. That is, the microphone module 510 may be tightly attached to the rear of the front panel 471.

A support member for tightly attaching the microphone module 510 may be provided. The cap decoration part 460 may be provided with a location part 462, in which the support member 560 is located.

At least a portion of the microphone module 510 is received in a holder 561. Consequently, the holder 561 may be pushed toward the front panel 471 such that the microphone module 510 is tightly attached to the rear of the front panel 471 and such that the tight contact therebetween is maintained. Consequently, the support member may include an elastic member 562 for elastically supporting the holder 561 and applying elastic force in the direction in which the holder 562 is pushed.

The holder 561 may be provided with a slit or slot 561a, through which the signal line 516 shown in FIG. 13 is withdrawn. That is, the microphone module may be received in the holder 561, and the signal line 516, which transmits the signal received from the microphone module to the outside, may extend to the outside of the holder 561 through the slit or slot 561a.

In the case in which the holder 561 is made of an elastic material, the signal line 516 may be stably supported in the state of extending through the slit or slot 561a.

The support member 560 may include a holder receiving part 563 for receiving the holder 561. The elastic member 562 may be interposed between the holder 561 and the holder receiving part 563. Consequently, force pushing the holder 561 forward may be continuously applied to the holder 561 from the holder receiving part 563.

Meanwhile, the holder receiving part 563 may be located in the location part 462 such that force pushing the holder receiving part 563 forward is continuously applied to the holder receiving part 563. That is, the support member 560, which includes the holder receiving part 563, may be located in the location part 462 such that the support member 560 is mounted in position and such that force pushing the support member 560 forward is automatically applied to the support member 560.

To this end, a cover 465 for covering the location part 462 may be provided. The cover may be a hinge cover 465 for covering the sub door hinge 130, which is mounted to the cap decoration part 460. That is, the support member may be pushed forward and supported as the hinge cover 465 is coupled to the cap decoration part 460.

Specifically, the cover 465 may be coupled to the cap decoration part 460 through a hook structure 465. At this time, the support member 560 may be pushed forward and fixed by a protrusion or rib 467 formed at the cover 465.

Consequently, the protrusion or rib 467 may push the entirety of the support member 560 forward, and may maintain this state. In addition, the elastic member 562 continuously pushes the holder 561 forward. As a result, the microphone module 510 remains in tight contact with the front panel 471. Of course, in this embodiment, the microphone module 510 may come into tight contact with the rear of the front panel 471 through the through hole 461.

The shape of the through hole 461 may correspond to that of the holder 561. Consequently, it is possible to prevent the holder 561 from moving in the through hole 461, thereby effectively maintaining the state in which the microphone module 510 is in tight contact.

Meanwhile, the PCB of the knock sensor module 500 may be mounted at the bottom of the cover 465. That is, the cap decoration part 460 may be provided with a space in which the sub door hinge and PCB are mounted. The signal line of the knock sensor module 500 may extend into the cabinet 10 or the main door through a through hole 131 in the sub door hinge 130 so as to be connected to the main controller 700.

In order to arrange the signal line, therefore, the knock sensor module 500 may be mounted at the upper cap decoration part, although the knock sensor module 500 may be mounted at any position at the edge of the door or the sub door.

Figure 15:
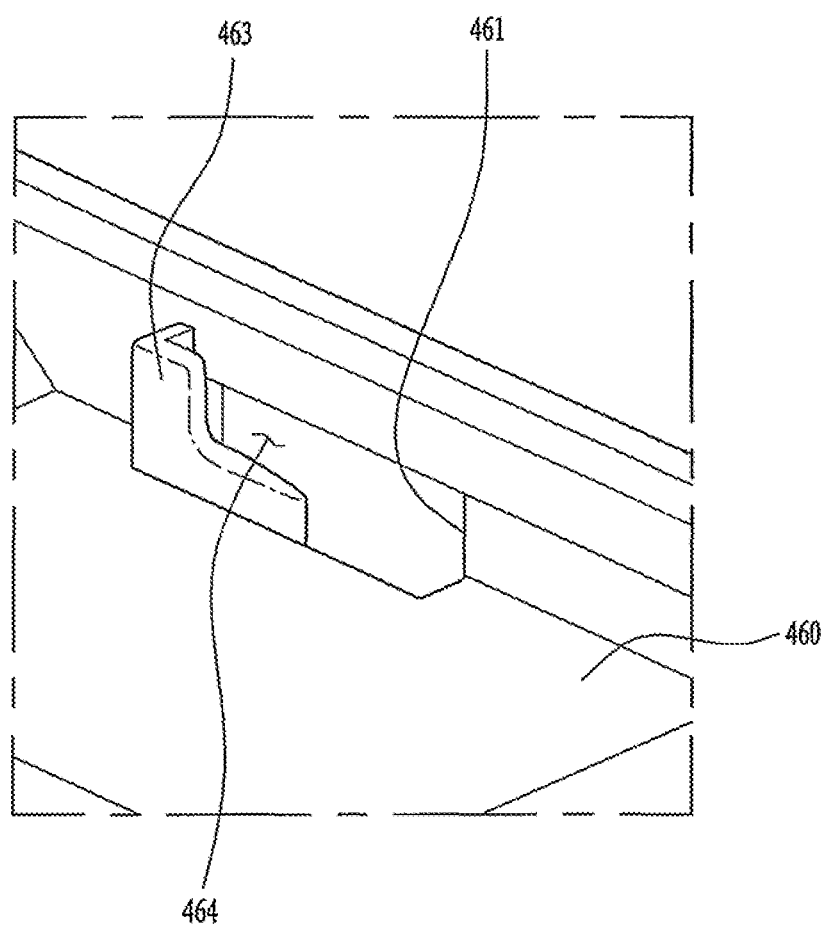
FIG. 15 is a partially enlarged view showing a cap decoration part having a through hole in another embodiment of the structure in which the vibration sensor (the microphone module) is mounted to the sub door of the second embodiment.
Figure 16:
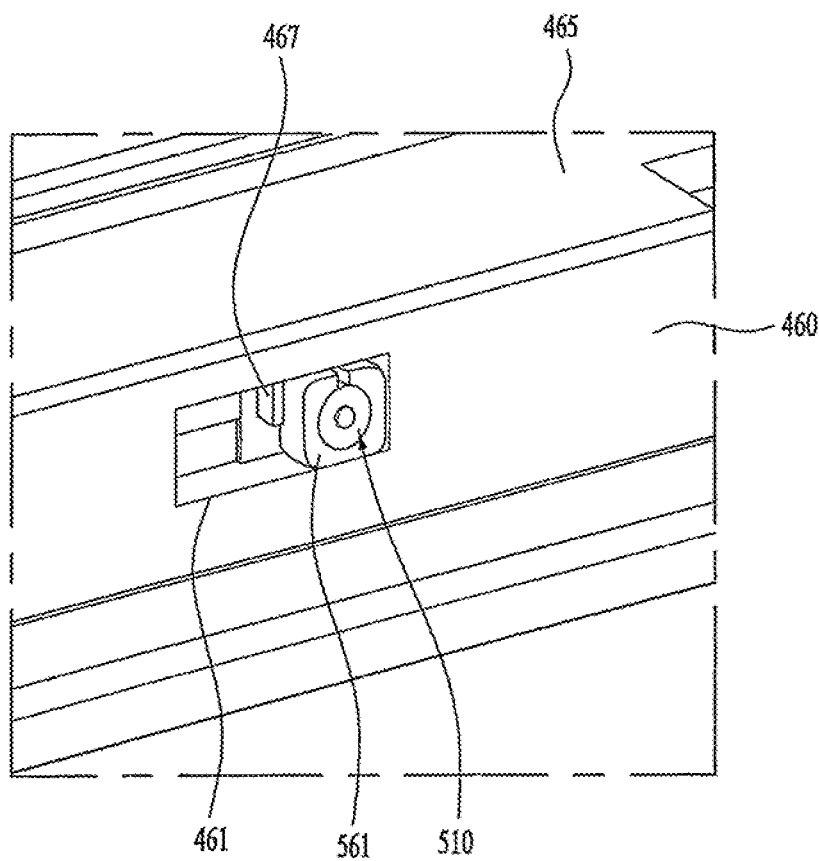
FIG. 16 is a perspective view showing the state in which a microphone module is mounted in the through hole shown in FIG. 15.

Hereinafter, another embodiment of the structure in which the microphone module 510 is mounted will be described with reference to FIGS. 15 and 16.

In this embodiment, the microphone module 510 is mounted using the door frame, particularly the cap decoration part 460, in the same manner as in the previous embodiment.

The cap decoration part 460 may be provided with a through hole 461. The microphone module 510 may come into tight contact with the rear of the front panel 471 through the through hole 461.

In the state in which the microphone module 510 is received in a holder 561 identical or similar to that of the previous embodiment, the holder 561 may continuously push the microphone module 510 toward the front panel such that the microphone module 510 remains in tight contact with the front panel.

The holder 561 may be made of an elastic member. Consequently, the holder 561 may be compressed so as to have elastic restoring force toward the front panel.

To this end, a holder mounting part 463 may be formed in the rear of the through hole 461. The holder 561 may be pushed and mounted in the holder mounting part 463 in the state of receiving the microphone module 510. The through hole 461 may be formed in the direction in which the holder is mounted so as to be larger than the holder 561. That is, in the case in which the holder 561 is pushed and mounted from the left side to the right side, as shown in FIG. 16, the leftward-rightward width of the through hole 461 may be larger than that of the holder 561. Of course, the upward-downward width of the through hole 461 may be equal to that of the holder 561 such that the upper and lower parts of the holder can come into tight contact with the through hole 461.

Specifically, a predetermined space 464 is formed between the holder mounting part 463 and the through hole 461. The holder 561 may be fitted into the space. More specifically, the forward-rearward width of the space is gradually reduced as the holder 561 is further inserted. That is, in the state in which the holder 561 is maximally inserted, the holder 561 is compressed in the forward-rearward direction. Consequently, the holder 561 has elastic restoring force, by which the holder 561 continuously pushes the microphone module 510 forward.

Meanwhile, in the state in which the holder 561 is maximally inserted, the holder 561 may be fixed by the cover 465. As previously described, the cover 465 is a cover for covering the cap decoration part 460 or a hinge cover for covering the sub door hinge 130. The cover 465 may be coupled to the cap decoration part 460 by a hook 466.

Figure 17:
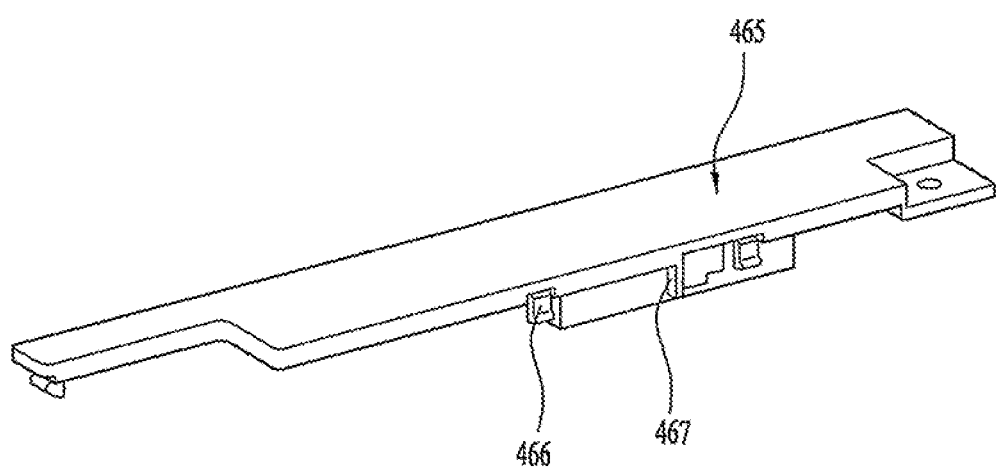
FIG. 17 is a perspective view showing a cover coupled to the cap decoration part shown in FIG. 15.

As shown in FIG. 17, the cover 465 may be provided at the bottom thereof with a protrusion or rib 467 protruding downward. When the cover 465 is coupled to the cap decoration part 460, the protrusion or rib 467 pushes one side of the holder 561. That is, the protrusion or rib 467 pushes one side of the holder 561 in the direction in which the holder 561 is inserted through the through hole 461.

Consequently, the holder 561 remains compressed in the holder mounting part 463, whereby the holder may be securely fixed irrespective of vibration or movement of the door. As a result, the microphone 510 may be tightly attached to the front panel 471, and this state may be continuously maintained.

In other words, as the holder 561 is correctly inserted into the through hole 461, the holder 561 is compressed in the forward-rearward direction. The rib 467 is provided to fix the holder 561 in position. Unless the rib 467 is removed, therefore, the holder 561 is fixed by the front panel, the rib 467, and the holder mounting part 463 in the state of being compressed, and this state may be maintained.

Figure 18:
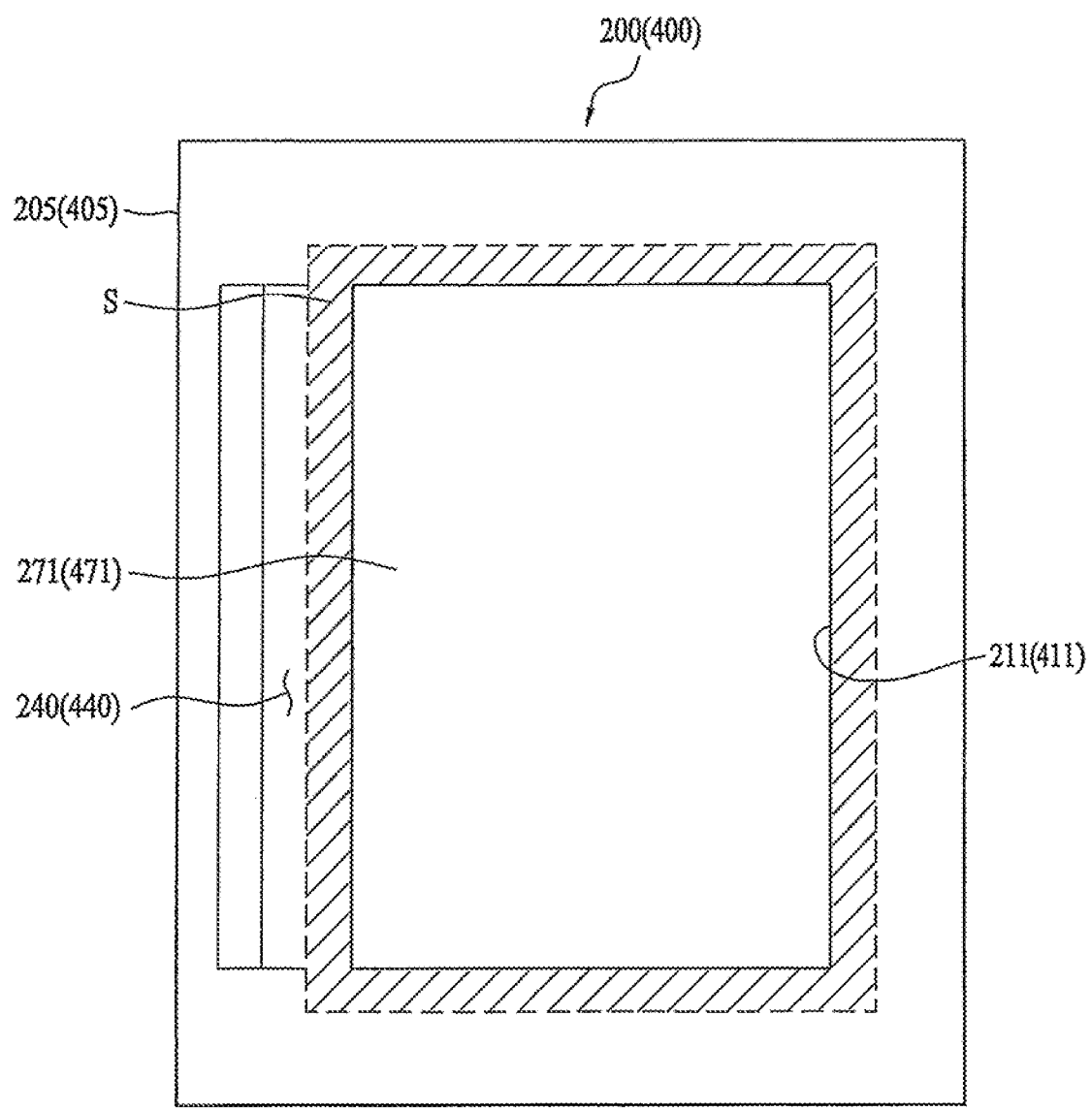
FIG. 18 is a conceptual view showing the position of a sub door at which a vibration sensor (a microphone module) is mounted and the position of the sub door on which a user taps.

FIG. 18 is a conceptual view showing the position of a see-through door at which the microphone module is mounted and the region of the see-through door in which a user performs a knock input. When the main door or the sub door is configured so as to be changed to a see-through door, the door has therein an opening 211 or 411. Consequently, the interior of the storage compartment or the sub storage compartment may be seen from the outside through the inner region of the opening in the radial direction.

As previously described, the inner region and a portion of the outer region of the opening in the front of the door may be regions defined by the front panel. As previously described, in the outside type door, the inner region and a portion of the outer region of the opening in the front of the door are defined by the front panel, and the edge of the door is defined by the door frame. In the inside type door, the entirety of the front of the door may be defined by the front panel.

Basically, therefore, a region in which a user knock input is performed may be the entirety of the region defined by the front of the front panel. Conceptually, however, a user knock input may be performed through a portion that is changed to the see-through door. The portion that is substantially changed to the see-through door may be the inner portion of the opening 211 or 411 in the radial direction. Consequently, the entirety of the inner area of the quadrangle defined by the opening 211 or 411 may be defined as a region in which a user knock input may be performed.

Since the knock input region is a see-through region, the microphone module may be mounted outside the knock input region. Of course, the region in which the microphone module is mounted may be a portion of the front panel extending in the radial direction.

Consequently, the region in which the microphone module is mounted may be outside the opening 211 or 411 in the radial direction. As shown in FIG. 18, the microphone module may be mounted in a hatched region S surrounding the opening.

Since the region S is not a see-through region, the user cannot easily recognize the microphone module from the front of the door, even though the microphone module is tightly attached to the front panel. That is, the microphone module does not interfere with the see-through region. As a result, it is possible to effectively enlarge the region in which a knock input can be performed. On the other hand, it is possible to sufficiently increase the distance between the knock input region and the region in which the microphone module is mounted. In addition, it is possible to achieve a more vivid and pleasing appearance through the see-through region.

Meanwhile, in order to sufficiently prevent the microphone module from being visually exposed from the front of the door, a printed layer may be formed on the rear of the region S. That is, a printed layer may be formed on the rear of the front panel corresponding to the region S. In the outside type door, however, the region S is covered by the door frame or the external door part, whereby the printed layer may be omitted.

As previously described, a user input for changing to the see-through door may be a knock input, which may be sensed by the microphone.

Meanwhile, the front of the door may be vibrated by various environmental factors. The front of the door may be vibrated by impact when the door is opened and closed or by strong external noise. Inputs generated by environmental factors may be determined to be knock signals.

When the user taps on the front of the door a plurality of times, it may be determined to be a normal knock input. More specifically, when the user taps on the front of the door a plurality of times at predetermined time intervals, it may be determined to be a normal knock input.

For example, when the user taps on the front of the door twice within a predetermined time, it may be determined to be a normal knock input. The results of analysis of normal user knock patterns show that the time interval between a first knock and a second knock is about 600 ms or less. That is, since 1 second is 1000 ms, when a first knock and a second knock are performed at an interval of less than 1 second, it may be determined to be a normal knock input.

Consequently, it is possible to prevent an abnormal input from being determined to be a knock signal by setting the time interval.

Meanwhile, the magnitudes of knocks performed by users may be different from each other. Since the media are the same, however, the vibration pattern deviation is very small, even though the deviation in magnitude is large. Consequently, the magnitude deviation of the knocks may be offset through an algorithm, and therefore it is possible to effectively recognize a normal knock input using a knock input pattern and the time interval between knocks as factors. This means that it is possible to greatly reduce the possibility of recognizing an abnormal input as a knock input.

As previously described, upon determining that a knock input has been performed, the controller 700 operates the illumination device 600. The controller 700 may perform control such that the illumination device 600 is turned off after a predetermined amount of time. In the case in which another knock input is performed before the predetermined amount of time, the controller 700 may perform control such that the illumination device 600 is turned off. The knock input at this time may be the same as a knock-on input, and a single knock input may be performed as a knock off input in order to distinguish between the knock off input and the knock-on input.

Of course, such a single knock input may be recognized within a predetermined time after the determination of knock-on.

As previously described, the entirety of the front of the door may be substantially formed as a knock-on input region through the use of the microphone. That is, a large region may be formed as a knock-on input region without mounting an additional sensor, such as a touch sensor or an electrostatic sensor, in the knock-on input region. This means that it is possible to prevent the increase of cost due to the touch sensor or the electrostatic sensor and an additional panel including the same and to improve durability. In addition, the structure of the door may be greatly simplified.

In addition, this means that it is possible to easily perform a knock-on input through a large region irrespective of the posture of the user or the freedom of the hands of the user. Furthermore, it is possible to form the knock-on input region so as to be substantially identical to the see-through region. Consequently, it is possible to omit an element that blocks the transmission of light, e.g. a touch panel, from the see-through region. Consequently, it is possible to realize a more unobstructed see-through region.

In the above embodiments, a user knock-on input is recognized using the microphone module so as to achieve a change to the see-through door. Specifically, a knock-on input performed on the front panel is recognized using the knock sensor module.

More specifically, a knock-on input is not recognized using only the microphone or the microphone module, and a knock sensor module including the same and a controller are separately provided. Consequently, it is possible to reduce the load of the main controller and to minimize the amount of noise that may be generated in the signal line between the main controller and the knock sensor module. That is, noise is minimized through modularization. In addition, the microphone module is tightly attached to the medium, on which a knock input is performed, whereby it is possible to minimize the effects caused by external noise.

The refrigerator may be generally installed in a kitchen, in which external noise may be occasionally generated. For example, external noise of 90 dB or higher may be generated. In the case in which such external noise is generated at a particular interval, this external noise may be incorrectly recognized as a knock-on input. That is, even in the case in which a user knock input is not performed, a knock based on external noise similar to a knock input may be applied to the front panel. In this case, since the refrigerator is automatically changed to the see-through door, the user may incorrectly deduce that the refrigerator is out of order. Consequently, it is necessary to provide a method of further reducing such a possibility.

Hereinafter, embodiments that are capable of greatly reducing incorrect recognition due to external noise in cooperation with the above-described basic embodiments will be described in detail.

Figure 19:
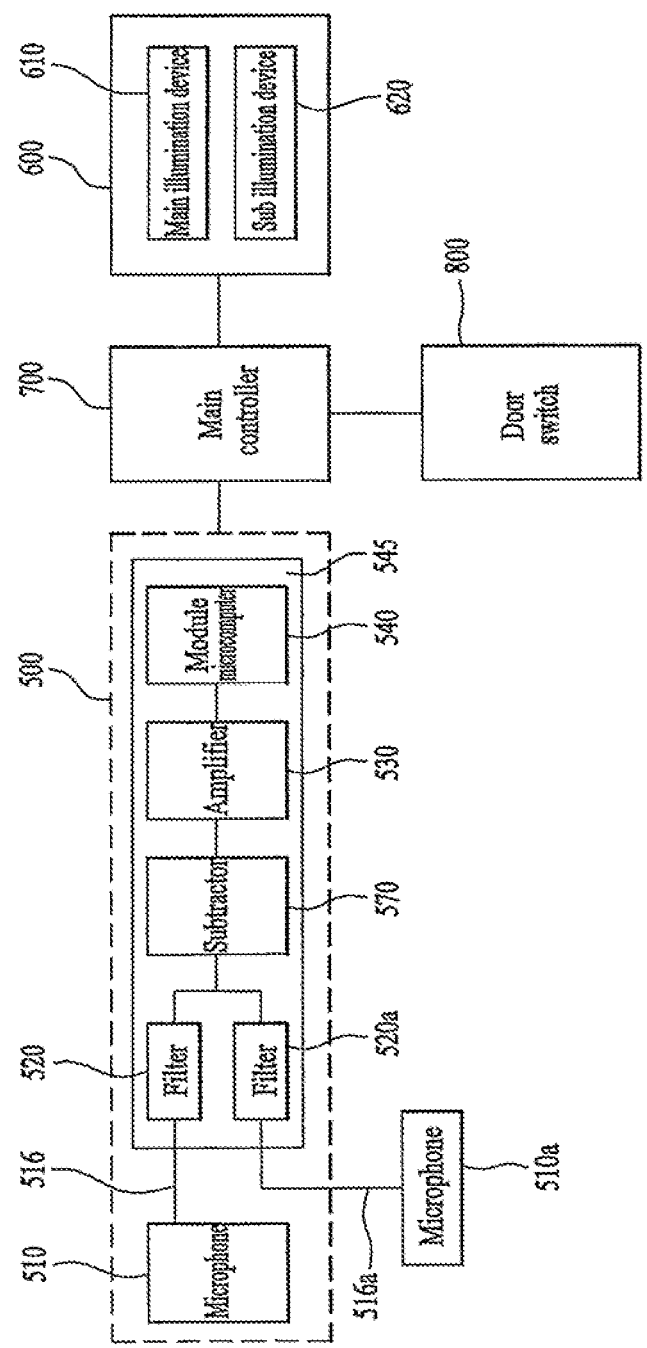
FIG. 19 is a block diagram showing a control configuration according to another embodiment of the present invention.

FIG. 19 is a block diagram showing an embodiment having a correction sensor for removing the effects caused by external noise.

This embodiment is characterized by further including a microphone or microphone module for sensing external noise. That is, this embodiment is characterized by further including an additional microphone or microphone module as a correction sensor for removing the effects caused by external noise.

The structure or operation of the microphone or microphone module may be identical or similar to that of the microphone or microphone module described with reference to FIGS. 10 and 11.

Specifically, in this embodiment, additional hardware is included to remove the effects caused by external noise.

As shown in FIG. 19, a microphone 510a or a microphone module as a correction sensor may be provided to sense external noise. The microphone 510a may be referred to as a second microphone. In addition to the second microphone, a second microphone receiving part identical or similar to that of the microphone 510 described above may be provided to constitute a second microphone module.

There is no necessity for the microphone 510a serving as the correction sensor to be tightly attached to the front panel in order to sense external noise. That is, it is sufficient to mount the microphone 510a serving as the correction sensor at any particular point of the refrigerator. The microphone 510a serving as the correction sensor may be referred to as a second microphone.

When a knock-on input is performed or external noise is generated, the microphone 510 for sensing the knock-on input and the microphone 510a for sensing the external noise sense sound waves. The sensed sound waves are subtracted by a subtractor 570. That is, the signal sensed by the second microphone 510a may be subtracted from the signal sensed by the microphone 510. Consequently, the effects of the external noise may be removed using two microphones.

For example, external noise that is very similar to a knock-on input may be generated. In this case, it may be incorrectly recognized as a knock-on input if only the microphone 510 is provided. In the case in which two microphones 510 and 510a are used, however, the microphones may recognize external noise that is very similar to the knock-on input. Consequently, it is possible to substantially remove the effects of the external noise by subtracting the signals sensed by the microphones.

The signal having passed through the subtractor 570 is input to the module microcomputer 540 via the amplifier 530. The module microcomputer 540 determines whether the input signal is a knock-on signal. That is, in this embodiment, the module microcomputer 540 is operated in the same manner as in the previous embodiment. In addition, the signals sensed by the microphones may be provided to the subtractor 570 after passing through filters 520 and 520a.

According to this embodiment, therefore, the effects of the external noise are removed, whereby it is possible to more correctly perform knock-on recognition.

As previously described, the position of the second microphone 510a for sensing the external noise is not particularly restricted. However, the second microphone 510a for sensing the external noise and the microphone 510 for sensing the knock input may be modularized into a single module. For this reason, the second microphone 510a may be provided adjacent to the microphone 510. That is, the microphone 510 and the second microphone 510a may be connected to a single PCB via two signal lines. Of course, there is no necessity for the second microphone to be tightly attached to the front panel. As will be described later, the second microphone 510a may be disposed in the space between the cap decoration part 460 and the cover 465.

Meanwhile, in this embodiment, the effects of external noise are removed using the additional hardware, i.e. the subtractor. Of course, in this embodiment, the microphone 510a and the subtractor 570 may be provided as a single module.

Figure 20:
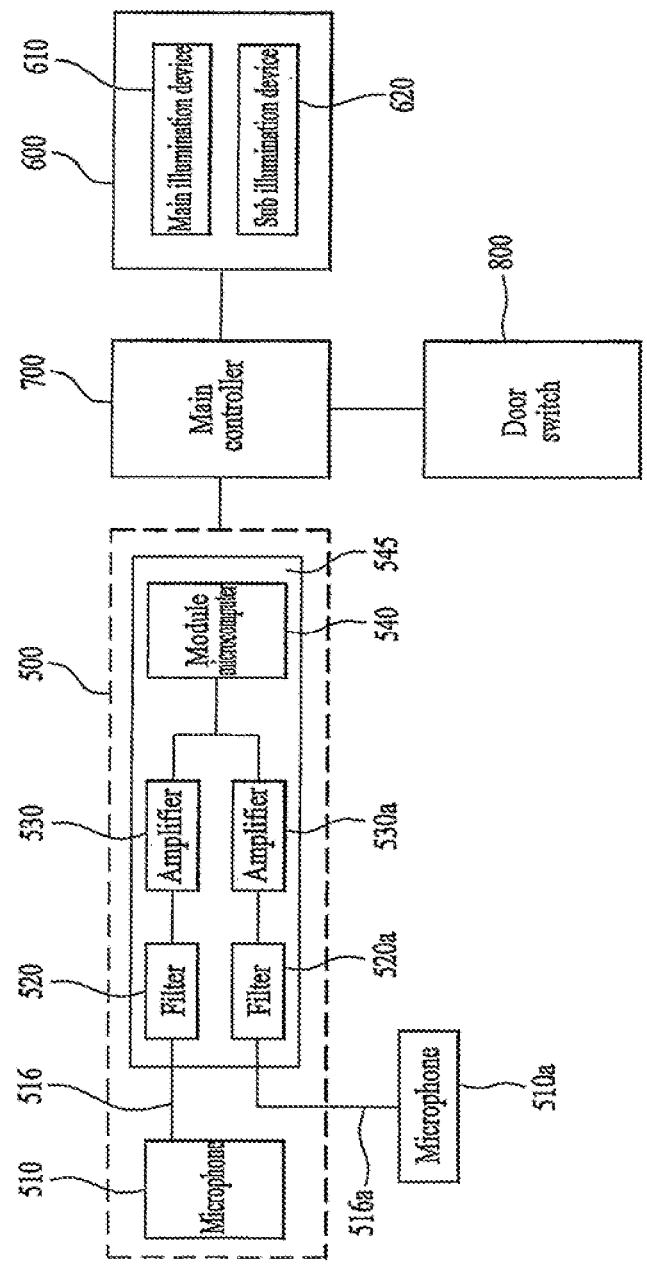
FIG. 20 is a block diagram showing a control configuration according to another embodiment of the present invention.

FIG. 20 is a block diagram showing another embodiment for removing the effects caused by external noise.

This embodiment is very similar to the embodiment shown in FIG. 19. In this embodiment, however, the effects of external noise are removed using the module microcomputer 540. That is, the module microcomputer 540 receives both an external noise and a knock-on signal, and removes the effects of the external noise through an algorithm.

That is, the module microcomputer 540 receives signals sensed by two microphones, and executes an algorithm for removing a noise source to find a knock-on input. For example, the module microcomputer 540 may execute an algorithm similar to a subtractor function.

In this embodiment, the effects of the external noise are removed using software. Consequently, a greater variety of algorithms, such as that of the subtractor, may be executed than when implemented using hardware. For example, when the magnitude of external noise is very large, it is possible to interrupt a knock-on function. That is, when the magnitude of signals received by the module microcomputer 540 is very large (i.e. when the amount of external noise is too large), it is possible to interrupt a knock-on function.

In the above embodiments, an additional microphone or microphone module for directly sensing external noise is included to minimize the effects caused by the external noise.

Hereinafter, an embodiment including a human body sensor as an example of a correction sensor for removing the effects of external noise will be described.

The human body sensor is a sensor for sensing whether a user has approached the refrigerator. That is, the human body sensor is a sensor having no relationship to sound waves.

First, a knock-on input is performed by the user. Consequently, the user must approach the refrigerator in order to perform a knock-on input. That is, the user approach to the refrigerator is of course required in order to perform a normal knock-on input. When an input similar to a knock-on input is generated due to external noise, therefore, the input may be disregarded.

Specifically, the human body sensor may be one selected from among an ultrasonic sensor, a passive infrared (PIR) sensor, an IR sensor, and an image sensor. That is, any sensor that is capable of sensing the motion of the user may be used. Specifically, the human body sensor may be a sensor for sensing variation in the motion of the human body. The above-mentioned sensors are obvious to those skilled in the art, and therefore a detailed description thereof will be omitted.

According to this embodiment, a normal knock-on signal may be generated in the case in which both a human body sensing condition, determined by the human body sensor, and a knock input condition, determined by the knock sensor module, are satisfied. When the normal knock-on signal is generated, the main controller may perform control such that the illumination device is operated. Of course, the main controller may perform control such that the illumination device is operated only when both a normal knock-on signal and a human body sensing signal are generated.

Figure 21:
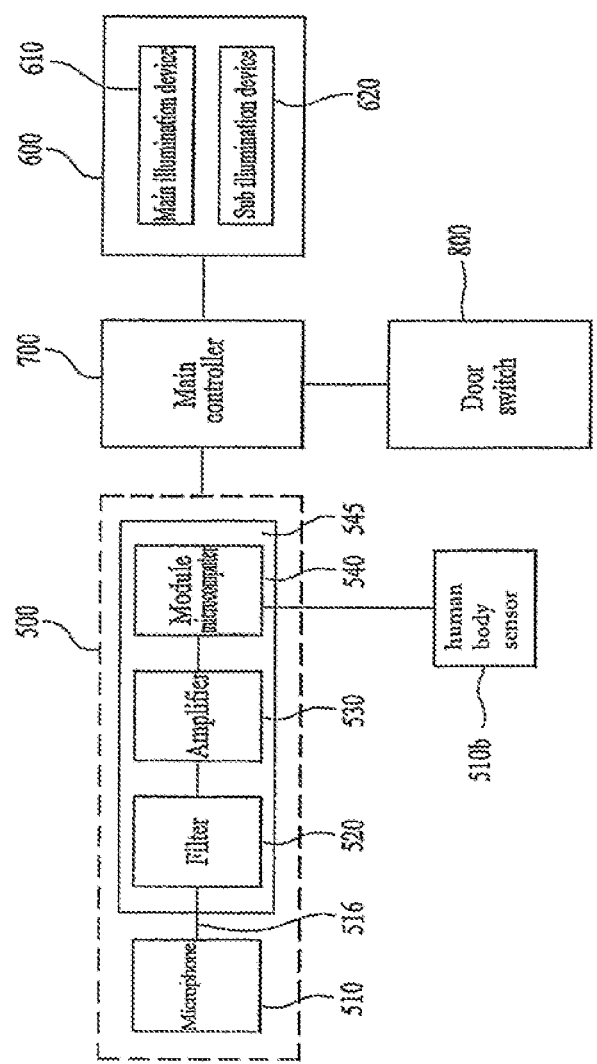
FIG. 21 is a block diagram showing a control configuration according to a further embodiment of the present invention.

As shown in FIG. 21, a human body sensor 510b serving as a correction sensor may constitute a module together with the knock sensor module 500. The human body sensor 510b may provide a signal indicating variation in the motion of the human body to the module microcomputer 540, which may determine than the user has approached the refrigerator.

Consequently, the module microcomputer 540 may determine that both the human body sensing condition and the knock input condition are satisfied, and may generate a knock-on signal. In this case, the human body sensor is provided separately from the main controller 700, whereby it is possible to prevent overload of the main controller 700.

In addition, the human body sensor 510b may be positioned adjacent to the knock sensor module 500 shown in FIG. 1. That is, the human body sensor 510b may be provided at the front of the door of the refrigerator. Consequently, it is possible to realize a single knock sensor module 500 including the human body sensor, thereby achieving ease of installation and cost reduction.

Of course, the human body sensor 510b may be directly connected to the main controller. That is, the main controller 700 may receive a knock-on signal from the knock sensor module 500 and a user approach signal from the human body sensor 510b. At this time, the main controller may perform control such that the illumination device 600 is turned on only when both conditions are satisfied.

For example, the main controller may receive a knock-on signal based on external noise. At this time, the main controller cannot receive the user approach signal from the human body sensor. Consequently, the main controller ignores the knock-on signal and prevents the illumination device from being turned on.

That is, it is possible to remove the effects of external noise using the human body sensor irrespective of whether the human body sensor is included in the knock sensor module or whether the human body sensor is connected to the main controller. Here, the removal of the effects of external noise may mean that the abnormal determination of external noise as a knock-on input is prevented. Of course, this may mean that, even when determination as a knock-on input is abnormally made, the illumination device is prevented from being turned on.

Industrial applicability has been described in the best mode.

A fundamental object of the present invention is to solve the above problems.

An embodiment of the present invention provides a refrigerator configured such that at least a portion of a door for opening and closing a storage compartment is transparent such that the interior of the storage compartment can be seen without opening the door.

An embodiment of the present invention provides a refrigerator including a see-through door, through which light is transmitted, i.e. a refrigerator configured such that the interior of the storage compartment can be seen through the door from outside the door.

An embodiment of the present invention provides a refrigerator having a selectively variable see-through door, i.e. a refrigerator configured such that a storage compartment cannot usually be seen through a door but such that the storage compartment can be seen through the door as needed.

An embodiment of the present invention provides a refrigerator configured such that user input for changing to a see-through door is easily performed and such that the external appearance of the refrigerator, particularly the external appearance of the front of the door, is not deteriorated by a user input structure.

An embodiment of the present invention provides a refrigerator configured such that the incidence of error in user input for changing to a see-through door, recognition error, or malfunctions can be reduced. In addition, an embodiment of the present invention provides a refrigerator configured such that the user input recognition rate is increased.

An embodiment of the present invention provides a refrigerator configured such that a user's tap on a door is effectively sensed so as to change to a see-through door, thereby improving convenience in use.

An embodiment of the present invention provides a refrigerator configured such that a user's tap on a door is effectively sensed even when the position of the door on which the user taps and the position at which the user's tap is sensed are spaced apart from each other.

An embodiment of the present invention provides a refrigerator configured such that the position of a door on which a user may tap is substantially extended to the entirety of the front of the door via the transmission of a sound wave through a medium.

An embodiment of the present invention provides a refrigerator configured such that a knock input is effectively sensed while the structure of the refrigerator is simplified to the exclusion of an expensive device, such as a touch panel.

An embodiment of the present invention provides a refrigerator configured such that heat insulation performance is secured and a door is stable and easy to manufacture.

An embodiment of the present invention provides a refrigerator including a door having a black panel, such as a TV or a computer monitor, wherein the door is changed to a see-through door using illumination as needed, thereby reducing energy consumption for changing to the see-through door.

An embodiment of the present invention provides a refrigerator configured such that the entirety of a see-through region of a door is set to a knock input region and such that a microphone module is mounted outside the see-through region to prevent the see-through region and the microphone module from overlapping each other, thereby providing an aesthetically pleasing appearance.

An embodiment of the present invention provides a refrigerator including a knock sensor module constituted by a microphone module and a module microcomputer to effectively remove noise generated in a signal line between a controller for controlling an illumination device and the knock sensor module.

An embodiment of the present invention provides a refrigerator that is capable of effectively preventing external noise, external impact, and vibration of the refrigerator from being incorrectly recognized as knock input. In particular, an embodiment of the present invention provides a refrigerator including a correction sensor that is separate from a vibration sensor or a knock sensor module to effectively prevent negative effects caused by external disturbance.

An embodiment of the present invention provides a refrigerator including a microphone module as an example of a correction sensor for effectively preventing effects caused by external disturbance.

An embodiment of the present invention provides a refrigerator including a human body sensor as an example of a correction sensor for effectively solving problems caused when a knock sensor module recognizes an external disturbance as a knock input.

In accordance with an aspect of the present invention, the above and other objects can be accomplished by the provision of a refrigerator including a cabinet having a storage compartment therein, an illumination device for illuminating the interior of the storage compartment, a door hinged to the cabinet for opening and closing the storage compartment, the door having an opening formed therein, a panel assembly provided at the door, the panel assembly having a front panel provided at the front of the door, a knock sensor module including a microphone for sensing a knock input applied to the door as a sound wave, and a controller for operating the illumination device such that light is transmitted through the panel assembly when the knock input is sensed, whereby the interior of the storage compartment can be seen through the opening from outside the door.

The controller may be provided separately from the knock sensor module. In particular, the controller may be provided separately from the module microcomputer. That is, the module microcomputer directly determines whether the knock input sensed by the microphone is a normal knock input. Consequently, it is possible to prevent overload of the controller. In addition, it is possible to reduce the length of a connection line or a signal line between the microphone and the module microcomputer, whereby it is possible to greatly reduce the effects of external noise introduced into the connection line or a signal line.

A microphone receiving part for receiving the microphone may be provided in order to constitute a microphone module together with the microphone.

The knock sensor module may include a module microcomputer provided separately from the controller. The module microcomputer may determine whether the knock input received from the microphone is a predetermined knock input, and may transmit the result of the determination to the controller. That is, the module microcomputer may determine whether a predetermined knock input has been performed (i.e. whether normal user input for operating the illumination device has been performed), and the controller, which directly controls the illumination device, may not perform such determination.

A support member for receiving the microphone module and for tightly attaching the microphone module to the front panel may be included. Here, the front panel may be a panel provided at the front of the door, which defines a see-through region. The front panel may have a region in which a user knock input is performed. Consequently, the front panel may be a medium through which knock vibration input by the user is transmitted to the microphone module. That is, the front panel may be a medium through which a sound wave generated by the knock vibration is transmitted to the microphone module. Consequently, the front panel may be formed such that the uniformity and continuity of the medium are maintained.

The support member may include a holder for receiving the microphone module and supporting the microphone module so as to be tightly attached to the front panel. The holder may be elastically supported so as to be tightly attached to the front panel. In particular, the holder may be made of an elastic material. When the holder is compressed, therefore, the holder may have elastic restoring force. As a result, the holder may continuously push the microphone module so as to be tightly attached to the front panel.

In accordance with another aspect of the present invention, there is provided a refrigerator including a cabinet having a storage compartment therein, a main door hinged to the cabinet for opening and closing the storage compartment, the main door having an opening formed therein, a sub storage compartment provided in the rear of the main door, an illumination device for illuminating the sub storage compartment, a sub door hinged to the main door or the cabinet for opening and dosing the sub storage compartment, the sub door having an opening formed therein, a panel assembly provided at the sub door, the panel assembly having a front panel provided at the front of the sub door, a microphone module for sensing a knock input applied to the sub door as a sound wave, and a controller for operating the illumination device such that light is transmitted through the panel assembly when the knock input is sensed, whereby the sub storage compartment can be seen through the opening in the sub door from outside the sub door.

The illumination device may be provided so as to illuminate a main storage compartment in addition to the sub storage compartment.

In accordance with another aspect of the present invention, there is provided a refrigerator including a cabinet having a storage compartment therein, an illumination device for illuminating the interior of the storage compartment, a door hinged to the cabinet for opening and closing the storage compartment, the door having an opening formed therein and a panel assembly having a front panel provided at the front thereof, a knock sensor module including a microphone module for sensing a sound wave generated by a knock input applied to the door and a module microcomputer for determining whether the knock input is a predetermined knock based on the sensed sound wave, and a controller provided separately from the module microcomputer for receiving a knock-on signal from the module microcomputer and operating the illumination device such that light is transmitted through the panel assembly, whereby the interior of the storage compartment can be seen from outside the door.

The door may be a main door for opening and closing the storage compartment or a sub door for opening and closing a sub storage compartment provided in the main door. The sub door may be located in front of the main door. That is, the sub door and the main door may be provided in the forward-rearward direction so as to overlap each other. The sub door may be inserted into the main door. That is, the sub door may be inserted into the inside of the main door in the radial direction.

The microphone module may include a microphone and a microphone receiving part for receiving the microphone, the microphone receiving part being provided to tightly attach the microphone to the front panel, which is the medium through which vibrations are transmitted.

The knock sensor module may include a noise filter for removing noise from the signal received from the microphone and an amplifier for amplifying the signal from which the noise has been removed. The module microcomputer may determine whether the knock input is a predetermined knock based on the signal amplified by the amplifier.

The knock sensor module may include a printed circuit board (PCB) on which the module microcomputer is mounted and a signal line for connecting the controller to the PCB.

The length of the signal line may be less than about 10 cm. Consequently, it is possible to reduce the effects of noise, which is caused by an external electromagnetic field and is then introduced into the signal line.

The knock sensor module may include a noise sensor provided separately from the microphone for sensing external noise in order to prevent incorrect sensing due to external noise or abnormal vibration.

The knock sensor module may include a subtractor for subtracting a signal received from the noise sensor from the signal received from the microphone to remove the effects caused by the signal received from the noise sensor.

The module microcomputer may determine whether the knock input is a predetermined knock after receiving the signal from the microphone and the signal from the noise sensor.

Consequently, the effects of external noise in the microphone for sensing the knock input may be removed by the noise sensor. That is, the microphone may sense both the knock input and external noise, or may sense only external noise. The effects of external noise may be removed by the noise sensor. Consequently, it is possible to greatly reduce incorrect recognition and malfunction due to external noise.

The noise sensor may include a second microphone and a second microphone receiving part for receiving the second microphone, the second microphone receiving part being provided to space the second microphone apart from the front panel, which is the medium through which vibrations are transmitted.

The refrigerator may further include a human body sensor for sensing a user approach to the refrigerator.

The controller may perform control such that the illumination device is not operated despite the knock-on signal in the case in which the human body sensor does not sense the user approach.

Of course, in the case in which the human body sensor does not sense the user approach, the knock-on signal may not be generated. That is, the module microcomputer may not generate a normal knock-on signal.

The human body sensor may be any one selected from among an ultrasonic sensor, a passive infrared (PIR) sensor, an IR sensor, and an image sensor, which sense variation in the motion of a human body.

The microphone module may be mounted so as to be tightly attached to the front or the rear of the front panel from the outside of the opening in the radial direction.

In accordance with another aspect of the present invention, there is provided a refrigerator including a cabinet having a storage compartment therein, an illumination device for illuminating the interior of the storage compartment, a door hinged to the cabinet for opening and closing the storage compartment, the door having an opening formed therein and a panel assembly having a front panel provided at the front thereof, a knock sensor module including a microphone module for sensing a sound wave generated by knock vibration applied to the front panel, a controller for, upon determining that the knock vibration is a predetermined knock, operating the illumination device such that light is transmitted through the panel assembly, whereby the interior of the storage compartment can be seen from outside the door, and a correction sensor provided separately from the microphone in order to prevent incorrect sensing of the knock sensor module due to external noise or abnormal vibration.

The door may be a main door for opening and closing the storage compartment or a sub door for opening and closing a sub storage compartment provided in the main door. The sub door may be located in front of the main door. That is, the sub door and the main door may be provided in the forward-rearward direction so as to overlap each other. The sub door may be inserted into the main door. That is, the sub door may be inserted into the inside of the main door in the radial direction.

The correction sensor may include a noise sensor having a second microphone, the noise sensor being provided to sense external noise and to remove the sensed noise.

The knock sensor module may include a module microcomputer for determining whether the knock vibration is a predetermined knock based on a signal received from the microphone and a signal received from the noise sensor.

Upon determining that the knock vibration is a predetermined knock, the module microcomputer may transmit a knock-on signal to the controller.

The knock sensor module may include a subtractor for subtracting the signal received from the noise sensor from the signal received from the microphone to remove the effects caused by the signal received from the noise sensor.

The correction sensor may further include a human body sensor for sensing a user approach to the refrigerator.

The controller may perform control such that the illumination device is not operated despite a determination that the knock vibration is a predetermined knock in the case in which the human body sensor does not sense the user approach. That is, when there is no user approach, a predetermined knock may be determined to be external disturbance, such as external noise.

The knock sensor module may include a module microcomputer for determining whether the knock vibration is a predetermined knock based on the signal received from the microphone. Upon determining that the knock vibration is the predetermined knock, the module microcomputer may transmit a knock-on signal to the controller.

The controller may perform control such that the illumination device is operated upon receiving both the knock-on signal from the module microcomputer and a human body approach signal from the human body sensor.

The module microcomputer may perform a determination as to both the human body approach received from the human body sensor and the knock input received from the microphone. Consequently, the module microcomputer may be a knock-on signal in the case in which both the human body sensing condition and the knock input condition are satisfied. In this case, the controller may perform control such that the illumination device is operated upon receiving the knock-on signal.

The refrigerator may further include an elastic microphone receiving part for receiving the microphone, the microphone receiving part being tightly attached to the front panel to form a sealed space between the microphone and the front panel.

In accordance with a further aspect of the present invention, there is provided a refrigerator including a cabinet having a storage compartment therein, an illumination device for illuminating the interior of the storage compartment, a door hinged to the cabinet for opening and closing the storage compartment, the door having an opening formed therein and a panel assembly having a front panel provided at the front thereof, a vibration sensor for sensing knock vibration applied to the front panel, a controller for, upon determining that the knock vibration sensed by the vibration sensor is a predetermined knock, operating the illumination device such that light is transmitted through the panel assembly, whereby the interior of the storage compartment can be seen from outside the door, and a correction sensor provided separately from the vibration sensor in order to prevent incorrect sensing of the vibration sensor module due to external noise or abnormal vibration.

The vibration sensor may include any one selected from between a microphone and an acceleration sensor.

The microphone may be provided to sense a sound wave transmitted through the front panel. Consequently, the sound wave may be a wave motion transmitted through the interior of the front panel.

The acceleration sensor may be provided to sense vibrations transmitted through the front panel. That is, the acceleration sensor may be provided to sense the vibration of the front panel. Consequently, the acceleration sensor may be a sensor for sensing a wave motion transmitted through the surface of the front panel.

Upon determining that the knock vibration is a normal knock input based on signals received from the vibration sensor and the correction sensor, the controller may operate the illumination device. The knock vibration may be determined to be a normal knock input based on the knock input to the vibration sensor. That is, the knock vibration may be determined to be a normal knock that is input based on the input sound wave or vibration. The correction sensor may be provided to sense the sound wave or vibration directly input by the user, rather than external disturbance. That is, the correction sensor may be a human body sensor for sensing the user. That is, in the case in which it is determined that the knock vibration is a normal knock input based on the signal sensed by the vibration sensor and the human body is sensed by the human body sensor, i.e. in the case in which both conditions are satisfied, it may be determined that the knock vibration is substantially a normal knock input. When both conditions are satisfied, the controller may perform control such that the illumination device is operated.

In the case in which the knock vibration is determined to be a normal knock input after the effects of the external noise or abnormal external vibration are removed through the vibration sensor and the correction sensor, the controller may operate the illumination device.

Here, the vibration sensor and the correction sensor may be the same kind of sensors. In the case in which the vibration sensor substantially includes a microphone for sensing a sound wave, the correction sensor may also include a microphone. In the case in which the vibration sensor is an acceleration sensor, the correction sensor may also be an acceleration sensor.

Consequently, the effects caused by the sound wave or vibration sensed by the correction sensor may be subtracted from the sound wave or vibration sensed by the vibration sensor.

First, in the case in which the vibration sensor and the correction sensor include microphones, both the microphones sense external noise. When a normal knock input is performed in the state in which external noise is generated, the microphone of the vibration sensor may sense the external noise as well as the normal knock input. At this time, the effects of the external noise sensed by the vibration sensor are removed in order to correctly determine the normal knock input. Of course, the microphones may be mounted at different positions. That is, one of the microphones may be mounted to effectively sense the normal knock input, and the other microphone may be mounted to effectively sense the external noise. Consequently, the microphone of the vibration sensor may be provided in the state of being tightly attached to the front panel, and the microphone of the correction sensor may be provided such that it is not tightly attached to the front panel.

Next, in the case in which acceleration sensors are used as the vibration sensor and the correction sensor, the acceleration sensors may be mounted at different positions. In addition, the acceleration sensors may be mounted on different media. The acceleration sensor used as the vibration sensor may be provided so as to be tightly attached to the front panel, and the acceleration sensor used as the correction sensor may be provided so as to be tightly attached to a medium other than the front panel. For example, the acceleration sensor used as the correction sensor may be provided so as to be tightly attached to the cabinet, a cap decoration part, or a hinge cover.

For example, when the refrigerator is vibrated due to strong external vibration, the vibration sensor and the correction sensor sense similar vibrations. Consequently, the sensed vibrations may be offset to effectively determine that such an input is not a knock input. In particular, when a normal knock input is performed in the state in which an external vibration is generated, the acceleration sensor used as the vibration sensor may sense the external noise as well as the vibration caused by the knock input. However, the acceleration sensor used as the correction sensor may sense only the external noise. The reason for this is that the two acceleration sensors are mounted on different media. Consequently, the effects of the external noise may be eliminated, thereby effectively determining a normal knock input.

Consequently, the correction sensor may be a kind of human body sensor different from the vibration sensor. Alternatively, the correction sensor may be the same kind of sound wave sensor or acceleration sensor as the vibration sensor.

According to an embodiment of the present invention, it is possible to provide a refrigerator configured such that at least a portion of a door for opening and closing a storage compartment is transparent such that the interior of the storage compartment can be seen without opening the door.

According to an embodiment of the present invention, it is possible to provide a refrigerator including a see-through door, through which light is transmitted, i.e. a refrigerator configured such that the interior of the storage compartment can be seen through the door from outside the door.

According to an embodiment of the present invention, it is possible to provide a refrigerator having a selectively variable see-through door, i.e. a refrigerator configured such that a storage compartment cannot usually be seen through a door but such that the storage compartment can be seen through the door as needed.

According to an embodiment of the present invention, it is possible to provide a refrigerator configured such that user input for changing to a see-through door is easily performed and such that the external appearance of the refrigerator, particularly the external appearance of the front of the door, is not deteriorated by the user input structure.

According to an embodiment of the present invention, it is possible to provide a refrigerator configured such that the incidence of error in user input for changing to a see-through door, recognition error, or malfunctions can be reduced. In addition, it is possible to provide a refrigerator configured such that the user input recognition rate is increased.

According to an embodiment of the present invention, it is possible to provide a refrigerator configured such that a user's tap on a door is effectively sensed for changing to a see-through door, thereby improving convenience in use.

According to an embodiment of the present invention, it is possible to provide a refrigerator configured such that a user's tap on a door is effectively sensed even though the position of the door on which the user taps and the position at which the user's tap is sensed are spaced apart from each other.

According to an embodiment of the present invention, it is possible to provide a refrigerator configured such that the position of a door on which a user taps is substantially extended to the entirety of the front of the door using a sound wave transmitted through a medium.

According to an embodiment of the present invention, it is possible to provide a refrigerator configured such that a knock input is effectively sensed while the structure of the refrigerator is simplified to the exclusion of an expensive device, such as a touch panel.

According to an embodiment of the present invention, it is possible to provide a refrigerator configured such that heat insulation performance is secured and a door is stable and easy to manufacture.

According to an embodiment of the present invention, it is possible to provide a refrigerator including a door having a black panel, such as a TV or a computer monitor, wherein the door is changed to a see-through door based on illumination as needed, thereby reducing energy consumption for changing to the see-through door.

According to an embodiment of the present invention, it is possible to provide a refrigerator configured such that the entirety of a see-through region of a door is set to a knock input region, a microphone module being mounted outside the see-through region to prevent the see-through region and the microphone module from overlapping each other, thereby providing an aesthetically pleasing appearance.

According to an embodiment of the present invention, it is possible to provide a refrigerator including a knock sensor module constituted by a microphone module and a module microcomputer to effectively remove noise generated in a signal line between a controller for controlling an illumination device and the knock sensor module.

According to an embodiment of the present invention, it is possible to provide a refrigerator that is capable of effectively preventing external noise, external impact, and vibration of the refrigerator from being incorrectly recognized as a knock input. In particular, an embodiment of the present invention provides a refrigerator including a correction sensor that is separate from a vibration sensor or a knock sensor module in order to effectively prevent negative effects caused by external disturbance.

According to an embodiment of the present invention, it is possible to provide a refrigerator including a microphone module as an example of a correction sensor to effectively prevent effects caused by external disturbance.

According to an embodiment of the present invention, it is possible to provide a refrigerator including a human body sensor as an example of a correction sensor for effectively solving problems caused when a knock sensor module recognizes an external disturbance as a knock input.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents. The features of the above embodiments may be applied in combination with those of other embodiments unless the features are contradictory or exclusive.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A refrigerator, comprising:
a cabinet having a storage compartment therein;
an illumination device for illuminating an interior of the storage compartment;
a main door hinged to the cabinet and configured to open and close the storage compartment; and
a sub door mounted to the main door or the cabinet and configured to be rotated about a sub door hinge, the sub door including a recess in which the sub door hinge is mounted, wherein the sub door includes:
a door frame having an opening;
a panel assembly to cover the opening and including a front panel provided in front of the recess and a vacuum insulation space provided at a rear side of the front panel; and
a knock sensor to sense a sound wave generated by a knock input applied to the sub door and in contact with a rear surface of the front panel.

2. The refrigerator of claim 1, wherein the panel assembly further includes a first insulation panel provided at the rear side of the front panel and a second insulation panel provided at a rear side of the first insulation panel, and wherein the vacuum insulation space is defined between the first insulation panel and the second insulation panel.

3. The refrigerator of claim 2, wherein the panel assembly further includes a sealing member disposed between the first insulation panel and the second insulation panel, and wherein one or more spacers is disposed in the vacuum insulation space between the first insulation panel and the second insulation panel.

4. The refrigerator of claim 3, wherein the sealing member is provided at a perimeter of the panel assembly.

5. The refrigerator of claim 2, wherein a distance between the front panel and the first insulation panel is greater than a distance between the first insulation panel and the second insulation panel.

6. The refrigerator of claim 2, wherein the first insulation panel comprises a hole and a plug to close the hole.

7. The refrigerator of claim 6, wherein the panel assembly further comprises a frit glass to cover the plug.

8. The refrigerator of claim 1, wherein the knock sensor includes a microphone to sense a sound wave generated by the knock input applied to the sub door, and a microphone receiver that receives the microphone, and wherein the microphone receiver is in contact with the rear surface of the front panel.

9. The refrigerator of claim 8, wherein the microphone is spaced apart from the rear surface of the front panel such that a space is defined between the microphone and the rear surface of the front panel.

10. The refrigerator of claim 1, wherein the front panel comprises a viewing area and a non-viewing area, and wherein the knock sensor is mounted at the non-viewing area of the front panel.

11. The refrigerator of claim 1, wherein the door frame further includes a receiver to receive the knock sensor, and wherein the knock sensor is in contact with the rear surface of the front panel in a state in which the knock sensor is received in a location portion.

12. The refrigerator of claim 11, wherein the door frame includes:
an external door that defines a front side of the sub door,
a door liner that defines a rear side of the sub door,
cap decorations coupled to upper and lower ends of the external door and the door liner, and wherein the receiver is provided in one of the cap decorations.

13. The refrigerator of claim 12, wherein the knock sensor includes a microphone to detect a sound wave generated by the knock input, and wherein the one of the cap decorations is provided with a through hole through which the microphone extends.

14. The refrigerator of claim 1, wherein based on detecting the knock input, the illumination device is turned on such that an interior of the storage compartment is viewable through the front panel of the sub door from outside, and wherein the illumination device is turned off after being turned on for a predetermined period of time.

15. A sub door for a refrigerator, the sub door being configured to be mounted to a main door or a cabinet of the refrigerator and rotated about a sub door hinge, the sub door comprising:
a door frame having an opening and a recess in which the sub door hinge is mounted;
a front panel provided in front of the opening and the recess;
a first insulation panel provided at a rear side of the front panel;
a second insulation panel provided at a rear side of the first insulation panel, wherein a vacuum insulation space is defined between the first insulation panel and the second insulation panel; and
a knock sensor configured to sense a knock applied to the sub door, wherein the knock sensor faces a rear surface of the front panel.

16. The sub door of claim 15, further comprising a sealing member disposed between and at a perimeter of the first insulation panel and the second insulation panel, wherein one or more spacers is disposed in the vacuum insulation space between the first insulation panel and the second insulation panel.

17. The sub door of claim 15, wherein the knock sensor includes a microphone to sense a sound wave generated by the knock applied to the sub door.

18. A refrigerator comprising the sub door of claim 15.

19. A refrigerator, comprising:
a cabinet having a storage compartment therein;
an illumination device for illuminating an interior of the storage compartment;
a main door hinged to the cabinet and configured to open and close the storage compartment; and
a sub door mounted to the main door or the cabinet and configured to be rotated about a sub door hinge, the sub door including a recess in which the sub door hinge is mounted, wherein the sub door includes:
a door frame having an opening;
a panel assembly to cover the opening and including a front panel provided in front of the recess; and
a knock sensor to sense a sound wave generated by a knock input applied to the sub door and in contact with a rear surface of the front panel, wherein the door frame further includes a receiver to receive the knock sensor, and wherein the knock sensor is in contact with the rear surface of the front panel in a state in which the knock sensor is received in a location portion.

* * * * *